(12) United States Patent
Petit-Huguenin

(10) Patent No.: US 10,097,693 B2
(45) Date of Patent: Oct. 9, 2018

(54) MANAGING DATA STREAMS FOR A COMMUNICATION NETWORK

(71) Applicant: Jive Communications, Inc., Orem, UT (US)

(72) Inventor: Marc Petit-Huguenin, Springville, UT (US)

(73) Assignee: JIVE COMMUNICATIONS, INC., Orem, UT (US)

( * ) Notice: Subject to any disclaimer, the term of this patent is extended or adjusted under 35 U.S.C. 154(b) by 770 days.

(21) Appl. No.: 14/335,249

(22) Filed: Jul. 18, 2014

(65) Prior Publication Data
US 2016/0021253 A1 Jan. 21, 2016

(51) Int. Cl.
*H04M 3/56* (2006.01)
*H04L 29/06* (2006.01)

(52) U.S. Cl.
CPC ........... *H04M 3/561* (2013.01); *H04L 63/00* (2013.01); *H04L 65/00* (2013.01); *H04L 63/065* (2013.01); *H04M 2203/6045* (2013.01)

(58) Field of Classification Search
None
See application file for complete search history.

(56) References Cited

U.S. PATENT DOCUMENTS

| | | | |
|---|---|---|---|
| 6,262,979 B1 * | 7/2001 | Anderson | H04L 12/1813 370/267 |
| 2003/0126464 A1 * | 7/2003 | McDaniel | G06F 21/604 726/4 |
| 2004/0203677 A1 * | 10/2004 | Brown | H04M 3/56 455/416 |
| 2010/0027775 A1 | 2/2010 | Boyer et al. | |
| 2012/0263287 A1 | 10/2012 | Gisby et al. | |
| 2012/0275349 A1 | 11/2012 | Boyer et al. | |
| 2013/0290418 A1 * | 10/2013 | Liu | H04L 12/1854 709/204 |
| 2014/0274368 A1 * | 9/2014 | Cotter | A63F 13/355 463/31 |

FOREIGN PATENT DOCUMENTS

WO WO 2016/010595 1/2016

OTHER PUBLICATIONS

International Search Report & Written Opinion issued in PCT/US2015/023162 dated Jun. 29, 2015.

* cited by examiner

*Primary Examiner* — Ayaz Sheikh
*Assistant Examiner* — Sori Aga
(74) *Attorney, Agent, or Firm* — Keller Jolley Preece

(57) ABSTRACT

The present application details methods and systems for facilitating within a network-based communication system, a communication session between a group of network devices. For example, the network device receives incoming data streams from other network devices in the communication session. The network device also sends an outgoing data stream to the other network devices in the communication session. Further, the network device combines the incoming data stream with the outgoing data stream and presents the combined data stream to a user.

20 Claims, 13 Drawing Sheets

MANAGING DATA STREAMS FOR A COMMUNICATION NETWORK

BACKGROUND

1. Technical Field

One or more embodiments disclosed herein relate generally to facilitating communications over a network. More specifically, one or more embodiments disclosed herein relate to managing data streams originating at various network devices within a communication network.

2. Background and Relevant Art

Advances in electronic communications technologies have interconnected people and allowed for better communication. To illustrate, users traditionally relied on a public switched telephone network ("PSTN") to speak with other users in real-time. With advances in communication technologies, users may communicate using network or Internet-based communication systems. One such network-based communication system is an Internet Protocol ("IP") telephone system, such as a voice over IP ("VoIP") network-based communication system that allows two or more users to communicate.

Conventional network-based communication systems commonly use a datacenter to provide services to each network device in the network-based communication system. For example, when multiple users want to participate in a conference call, the datacenter may facilitate the conference call. In particular, in many conventional network-based communication systems, the datacenter receives a data stream (e.g., voice data) from each network device (e.g., each user) in the conference call. The datacenter, in conventional network-based systems, can then combine the received data stream from each network device, and then distribute a combined data stream to each network device participating in the conference call.

Although conventional systems can facilitate a conference call, a number of disadvantages exist with respect to convention network-based systems. For example, conventional network-based systems are often limited in the number of users that can participate in a conference call. For instance, because the datacenter, in a conventional network-based communication system, processes, combines, and distributes all the data streams during a conference call, the datacenter must limit the number of users to only a few users based on inherent processing limitations of a datacenter.

Similarly, due to the inherent processing limitations of a datacenter, conventional network-based systems often experience quality problems associated with conference calls. For instance, in conventional network-based communication systems, as additional users are added to a conference call, the limited processing capabilities of a datacenter often cannot accurately or reliably process all the data streams fast enough. Thus, as the data center processes the various data streams, the data center my lose or drop data packets, thus diminishing the quality of the conference call.

As another disadvantage, conventional network-based systems can restrict network mobility. For instance, when multiple users participate in a conference call, data streams from each user in the conference call must be sent to the datacenter and back to each user, regardless of the location of the users. Next, the datacenter combines the multiple data streams into a combined data stream. Then, the datacenter sends the combined data stream back to each user participating in the conference call. Thus, in many conventional network-based communication systems, data streams may travel large geographic distances. As a result, data streams in conventional network-based systems become more susceptible to errors, latency, connection faults, etc.

In addition to the above disadvantages, conventional network-based systems can suffer from conference call failures (e.g., dropped calls) and general reliability issues. For example, a datacenter failure can disconnect the entire conference call dropping each of the users participating in a conference call. For instance, accidents, such as a power failure, or a malicious attack at the datacenter can cripple the datacenter and result in conference calls being dropped altogether. Further, in conventional network-based systems, connection errors or faults in a connection between a network device (e.g., VOIP phone) and the datacenter may result in the disconnection of the user from a conference call, and in some cases, requiring the entire conference call process to be reinitiated to allow the disconnected user to rejoin.

Accordingly, there are a number of considerations to be made in improving the convenience, access, and systems associated with network-based communication systems.

BRIEF SUMMARY

Embodiments disclosed herein provide benefits and/or solve one or more of the foregoing problems or other problems in the art with improving user communication in a network-based communication system. In particular, example embodiments include systems and methods that allow a network device to facilitate a multi-device communication session (e.g., conference call) for a user using the network device. For example, one or more embodiments herein disclose systems and methods that allow a network device to locally combine multiple data streams for other network devices participating in a communication session without the need of a datacenter.

In one or more embodiments, the systems and methods disclosed herein improve communications between a group of users participating in a multi-device communication session. For example, one or more embodiments include systems and methods to establish a multi-device communication session between users. In addition, one or more embodiments disclosed herein provide systems and methods for a network device to locally combine data streams from other users in a multi-device communication session and to provide the combined data stream to a user using the network device. As a result, a group of users can participate in a multi-device communication session without requiring a datacenter to host the multi-device communication session.

Additional features and advantages disclosed herein will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
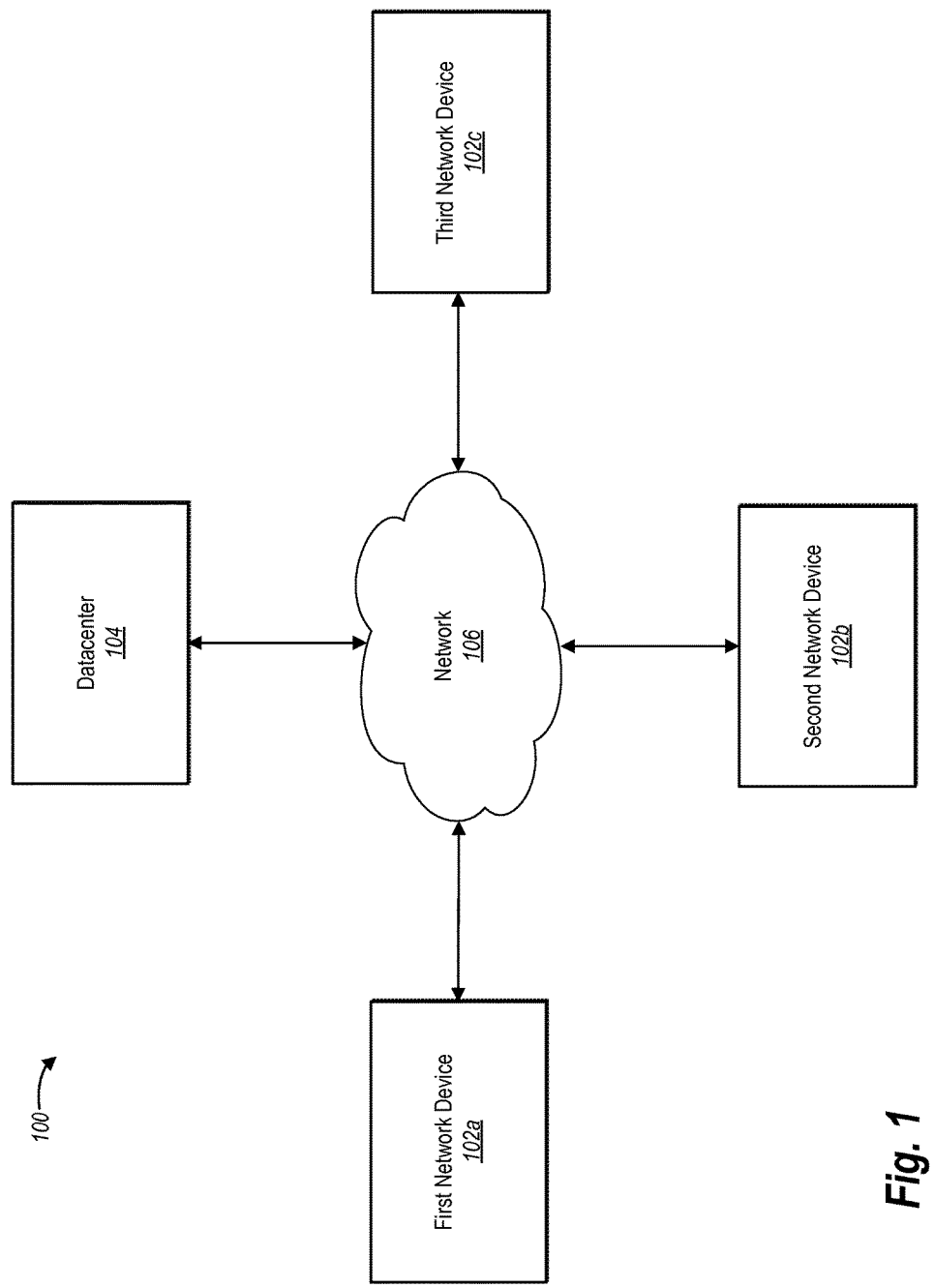
FIG. 1 illustrates a network-based communication system in accordance with one or more embodiments disclosed herein.

Embodiments disclosed herein provide benefits and/or solve one or more of the abovementioned problems or other problems in the art with improving user communication in a network-based communication system. For example, one or more example embodiments include a network-based communication system that facilitates a multi-device communication session (e.g., conference call) by combining the various data streams from each participant on a per network device basis. Thus, unlike conventional network-based communication systems described above, where a datacenter is required to combine all of the data streams together from multiple users participating in a conference call, and to provide the combined data stream back to each user, one or more embodiments disclose a network-based communication system that facilitates a multi-device communication session without having to process the data streams at the datacenter.

For example, in some embodiments, a network device can initiate a multi-device communication session between a user using a network device and other users using other network devices. More specifically, the network device can receive multiple data streams from the other network devices during the multi-device communication session. In addition, the network device can also send a data stream to the other network devices associated with the other users participating in the multi-device communication session. For instance, the network device can send a single data stream to a duplicator that duplicates the data stream and provides a copy of the data stream to each network device participating in the multi-device communication session.

In one or more embodiments, the network device can communicate with a datacenter to establish a multi-device communication session. For example, when a user desires to communicate with other users, the network device associated with the user can obtain, from a datacenter, addresses that correspond to other network devices associated with the other users. Upon obtaining the addresses from the datacenter, the network device can locally establish the multi-device communication session without the datacenter. Alternatively, in some embodiments, the datacenter can setup a multi-device communication session between each of the users. Once a datacenter establishes the multi-device communication session, the network device can support the multi-device communication session without the use of the datacenter.

Further, in one or more embodiments, a network device can, without the datacenter, communicate with other network devices participating in a multi-device communication session to establish security protocols for the multi-device communication session. For example, a network device can negotiate a shared security element with other network devices when establishing a multi-device communication session with the other network devices. The network device can renegotiate a new shared security element with each network device in the multi-device communication session each time a network device joins or leaves the multi-device communication session. In this manner, the network device can protect against unwanted parties attempting to access the multi-device communication session.

As will be further appreciated in light of the discussion below, one or more embodiments of a network-based communication system provides a number of benefits compared to conventional methods and systems. For example, embodiments disclosed herein provide improved scalability, increased network mobility, as well as increased communication quality and reliability.

For example, in some embodiments, the network-based communication system can provide a multi-device communication session with improved scalability. In particular, due to the fact the data streams associated with each device are combined on a per device basis (e.g., at a network device itself or at a hardware component associated with a network device), an increased number of network devices can participate in a multi-device communication session. As described above, in conventional network-based systems, a datacenter processes both incoming and outgoing data streams for each network device in a multi-device communication session. As such, processing at the datacenter considerably increases each time a network device is added to a multi-device communication session.

In contrast, according to embodiments disclosed herein, the data streams are combined and delivered on a per network device basis, thus negating the conventional method of combining all data streams at a data center and distributing the combined data stream to each participating network device. Instead, for example, each network device receives a data stream from each participating network device and the network device combines each received data stream to provide a combined stream to the user. Note, in one or more embodiments disclosed herein, a combined stream is not distributed across the network, thus reducing the processor resources needed to facilitate the conference call, as well as reducing bandwidth consumption.

Due to the fact that a combined stream is not distributed across the communication network, less processing resources are required, which make it possible to accommodate additional devices in a multi-device communication session. Accordingly, embodiments disclosed herein do not limit the number of network devices that can participate in a multi-device communication session, unlike conventional network-based systems.

Additionally, one or more embodiments disclosed herein provide for improved mobility in a network-based communication system. For example, a network device can facilitate a multi-device communication session without the need of a datacenter. In particular, each network device in the multi-device communication session can combine data streams from the other network devices in the multi-device communication session. Thus, the data stream from one user need only to travel to network devices associated with other users participating in the multi-device communication session.

As a simple example, if a group of users are located in Toronto, and the closest datacenter is located in Houston, conventional network-based communication systems often require each user to send a data stream from Toronto to Houston, where the datacenter combines the data streams from each user, and the datacenter sends a combined data stream back to each user in Toronto. In contrast, embodiments disclosed herein allow the group of users in Toronto to participate in a multi-device communication session without any of the user's data streams leaving the Toronto area.

Accordingly, the embodiments disclosed herein improve network mobility allowing the network area for a particular communication session to be based on the location of each network device in a multi-device communication session, rather than requiring the network to extend to include a datacenter. In addition, one or more embodiments disclosed herein reduce network errors, latency, connection faults, etc., that can result in a multi-device communication session through reducing the geographic size of the network used to host a multi-device communication session.

As another benefit, one or more embodiments disclosed herein provide for improved reliability to a network-based communication system. As described herein, each network device in the multi-device communication session can combine data streams from the other network devices in the multi-device communication session. Accordingly, if one of the network devices in the multi-device communication session fails or disconnects, the multi-device communication session can continue with the remaining users participating in the multi-device communication session.

Further, some embodiments disclosed herein provide for reconnecting a network device to a multi-device communication session when the network device drops from the multi-device communication session. For example, each network device participating in a multi-device communication session stores state information for the other network devices in the multi-device communication session. If a network device drops from a multi-device communication session, the network device can use the state information of the other network devices to reconnect to the multi-device communication session. Further, when one of the network devices drops from a multi-device communication session, and later the network device requests to rejoin the multi-device communication session, the other network devices can allow the network device to rejoin the multi-device communication session based on the stored state information associated with the network device. As such, one or more embodiments disclosed herein provide for improved reliability of a network-based communication system.

Additional advantages and benefits of the system will become apparent in view of the below description. In particular, one or more embodiments of the system will be described below with reference to one or more figures. In addition, the following definitions of terms will be used to describe one or more features of the system.

As used herein, the term "datacenter" refers generally to one or more computing devices that can facilitate the set up of a communication session between two or more network devices. In some configurations, a datacenter refers to a facility that houses computer systems and associated components, such as telecommunications and storage systems. For example, one of skill on the art will appreciate that a datacenter may comprise a single computing device or that a datacenter may comprise a building housing computers, servers, and other components facilitating communication for thousands of network devices.

In addition, the term "network device" as used herein refers generally to a computing device that is used to participate in a communication session, such as a multi-device communication session. A network device can communicate with a datacenter and other network devices. In general, a network device is associated with a user using the network device, however, some network devices maybe standalone devices that are not necessarily associated with a user. For example, a user may use a network device to communicate with a second user associated with a second network device. A variety of network devices may employ VoIP technology, such as personal computers, handheld devices, mobile phones, smartphones, and other electronic access devices. As an example, a network device may be a dedicated VoIP device or soft VoIP device. Dedicated and soft devices are described in greater detail below in connection with FIG. 11.

As used herein, the terms "communication session," refers generally to a communication interaction between users that occurs over an IP network. For example a communication session may include voice or video calling, video conferencing, streaming multimedia distribution, instant messaging, presence information sharing, file transferring, faxing over IP, and online gaming. For instance, a session may be part of the session initiation protocol ("SIP"), which is a signaling communications protocol commonly used in network-based communication systems. Likewise, a session may refer to a communication session using other protocols common to IP peer communications.

Further, the term "multi-device communication session," as used herein, generally refers to a communication session between three or more devices. For example, a group of three or more users (referred to as "a group of users") can participate in a multi-device communication session. Further, users (e.g., network devices associated with users) can be in a multi-device communication session with other devices, such as a remote server, a voicemail service, etc.

As used herein, the term "data stream" refers generally to a stream of data being sent from a computing device, such as a network device, a datacenter, a network server, etc. For example, a network device can send a stream of data packets containing audio data and/or video data to another user. A data stream often contains sequenced data that a network device can order upon arrival at the network device. In some cases, data streams can contain timing information used to synchronize the data stream with other data streams that a network device may receive.

Although the disclosure discusses VoIP telephone network-based systems, it should be understood that the principles, systems, and methods disclosed herein may also be effectively used in other types of packet-based IP communication networks and unified (e.g., real-time) communication systems. For instance, the principles described may be used for sending faxes, text messages, and voice-messages over a network-based communication system.

FIG. 1, for example, illustrates a network-based communications system 100 (or simply "system 100") in accordance with one or more embodiments disclosed herein. An overview of the system 100 will be described next in relation to FIG. 1. Thereafter, a more detailed description of the components and processes of the system 100 will be described in relation to the remaining figures.

As illustrated by FIG. 1, the system 100 may include, but is not limited to, a first network device 102a, a second network device 102b and a third network device 102c, and a datacenter 104. As shown, network devices 102a-c (or collectively, "network devices 102") may be present in the system 100. Similarly, while not illustrated, the system 100 may include multiple datacenters. For example, the system 100 may include almost any number of network devices 102 and/or datacenters 104.

The network devices 102 and the datacenters 104 are connected via a network 106. In some configurations, the network 106 may be the Internet, an intranet, a private network, or another type of computer network. The network 106 may be a combination of Internet and intranet networks. Additional details regarding the network will be discussed below with respect to FIGS. 10 and 11.

The network devices 102 can participate is a multi-device communication session with each other. For example, the first network device 102a can participate in a multi-device communication session with the second network device 102b and the third network device 102c. In some cases, the datacenter 104 may assist the first network device 102a in setting up the multi-device communication session with the second network device 102b and the third network device 102c. However, once the datacenter 104 sets up or establishes the multi-device communication session, the network device 102 can carry on the multi-device communication session without direct support of the datacenter 104. In addition, in one or more embodiments, the first network device 102a can directly establish the multi-device communication session with the second network device 102b and the third network device 102c without involvement from the datacenter 104.

In one or more embodiments, the datacenter 104 can also facilitate communications between network devices 102 and other datacenters in the system 100. For example, the datacenter 102 can serve as a gateway between network devices 102. As another example, the datacenter 102 can provide network address translation traversal (or "NAT-T") functionality between multiple network devices 102.

In some embodiments, a PSTN device, such as a traditional telephone, on a PSTN can participate in a multi-device communication session with one or more network devices 102. For example, a traditional telephone can connect to the datacenter 104 and through the datacenter 104 the traditional telephone can participate in a multi-device communication session with the first network device 102a. In this manner, the datacenter 104 can serve as a gateway for traditional telephones to participate in a multi-device communication session. Additional detail regarding PSTN devices communicating with network devices 102 on the network-based communication system is described below.

Figure 2:
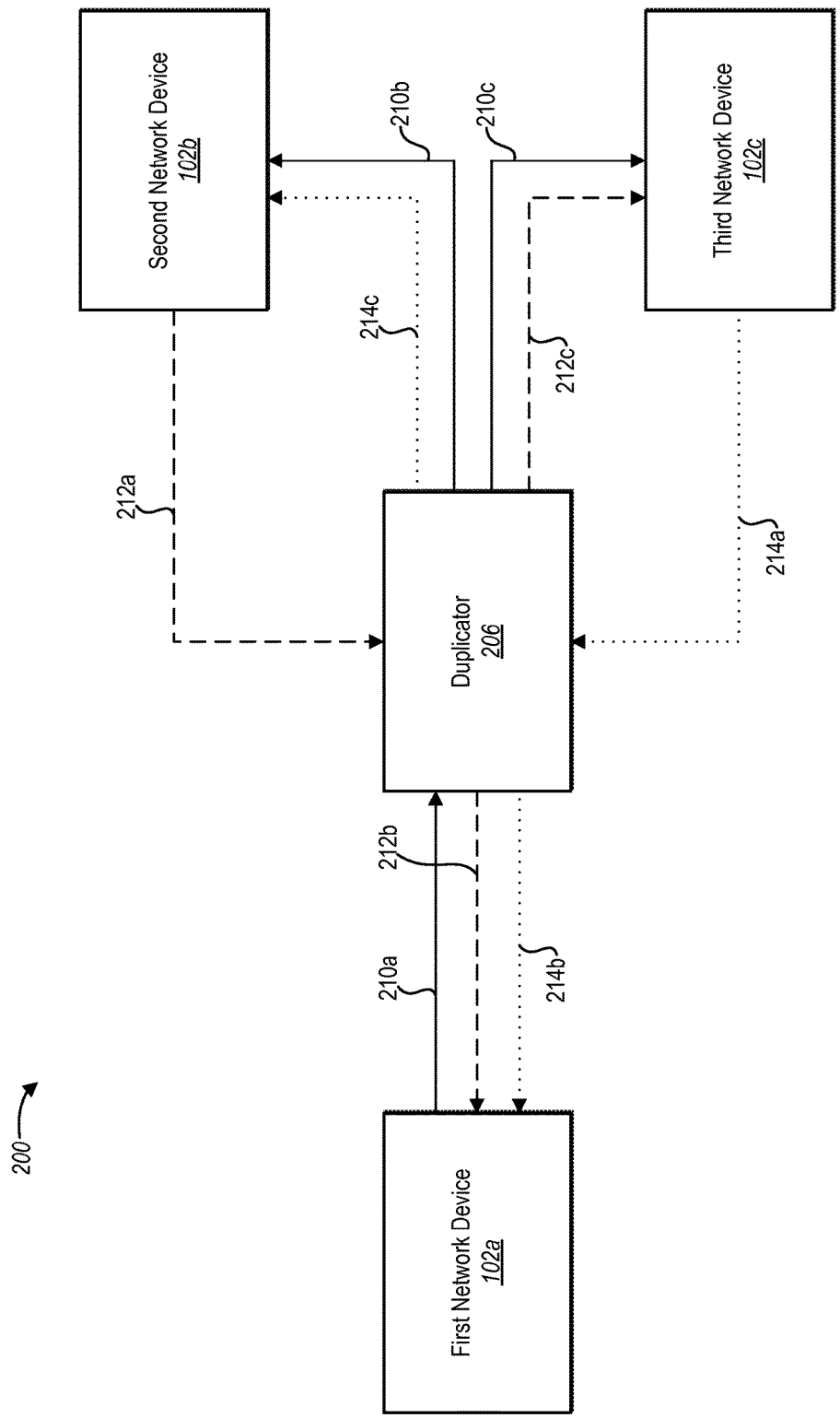
FIG. 2 illustrates multiple network devices participating in a communication session in accordance with one or more embodiments disclosed herein.

FIG. 2 illustrates a network-based communication system 200 (or "system 200") that includes multiple network devices 102 participating in a multi-device communication session in the network-based communication system 100 of FIG. 1. In particular, the network devices 102 in FIG. 2 include the first network device 102a, the second network device 102b, and the third network device 102c.

FIG. 2 also illustrates a duplicator 206. Multiple network devices 102 can communicate with the duplicator 206. For simplicity, a single duplicator 206 is shown in FIG. 2, however, the system 200 can include multiple duplicators. For example, the system 200 can include a several duplicators 206, wherein each of the network devices 102 is associated its own duplicator 206. Alternatively, a group of network devices 102 can use the same duplicator 206. For example, a group of network devices 102 in an office environment can share a duplicator 206 located in the office environment, such as on customer premises equipment.

The duplicator 206 can replicate one or more data streams. For example, the duplicator 206 can create and distribute copies of a data stream received from a network device 102. In particular, and as illustrated in FIG. 2, the first network device 102a can provide the duplicator 206 with a first data stream 210a, and the duplicator 206 can create duplicative copies of the first data stream 210b, and 210c.

In some embodiments, the duplicator 206 can also provide routing capacities. For example, once the duplicator 206 copies an incoming data stream, the duplicator 206 can send a copy of the data stream to multiple network devices 102 in the communication system 200. Alternatively, the duplicator 206 can send copies of a data stream to a router to be forwarded to network devices 102 in the system 200.

In particular, the duplicator 206 can appropriately address copies of a received data stream. For example, and as shown in FIG. 2, the first network device 102a can send, to the duplicator 206, a first data stream 210a addressed to the second network device 102b and the third network device 102c. Upon receipt of the data stream 210a from the first network device 102a, the duplicator 206 can create two copies of the received first data stream 210a, one copy of the first data stream 210b addressed to the second network device 102b and one copy of the first data stream 210c addressed to the third network device 102c.

As illustrated in FIG. 2, the network devices 102 can facilitate a multi-device communication session with between each other. In particular, the first network device 102a can send, via the duplicator 206, a first data stream 210 to the second network device 102b and the third network device 102c. The first network device 102a can also receive a second data stream 212b from the second network device 102b and a third data stream 214b from the third network device 102c.

In one or more embodiments, the first network device 102a can combine the first data stream 210, the second data stream 212, and the third data stream 214, and can provide the combined data stream to a first user using the first network device 102a. Similarly, the second network device 102b can combine the second data stream 212 with the first data stream 210 and the third data stream 214, and can provide the combined data stream to a second user using the second network device 102b. Further, the third network device 102c can combine the third data stream 214 with the first data stream 210 and the second data stream 212, and can provide the combined data stream to a third user using the third network device 102c. In this manner, the first, second, and third network devices 102 can participate in a multi-device communication session without the need of a datacenter 104.

Further, because each network device 102 serves as a localized mixer, additional network devices 102 can participate in a multi-device communication session. For example, when the first network device 102a, second network device 102b, and third network device 102c are participating in a multi-device communication session (e.g., conference call), each network device 102 is combining the data streams from the two other network devices 102. If a fourth network device joins the conference call, each network device 102 merely adds the data stream from the fourth network device to the other data streams before providing the combined data stream to the associated user.

In contrast, in some conventional network-based communication systems, adding a fourth network device requires a datacenter 104 to increases the processing load at the datacenter 104 from processing nine (9) data streams to sixteen (16) data streams. Similarly, in some conventional network-based communication systems, adding a fifth network device requires a datacenter 104 to additionally increases the processing load to twenty-five (25) data streams. In contrast, adding a fifth network device according to embodiments disclosed herein increases processing at each network device 102 from combining three incoming data streams to combining four incoming data streams with the outgoing data stream.

The system 200 also allows for disaggregated media within multi-device communication session between the network devices 102. In particular, the system 200 can originate and terminate media on different network devices 102. For instance, a user can utilize a first network device to capture video and audio, as well as play audio, within a multi-device communication session. At the same time, the user can utilize a second device to present video from the multi-device communication session. For example, a user can use a smartphone to capture video/audio and present audio in a multi-device communication session, and a monitor to display video for the multi-device communication session. Thus, the audio presented via the smart phone and the video displayed on the monitor can be synchronized.

In addition, the system 200 can use disaggregated media to serve different media types to network devices 102 to accommodate the capabilities of the network device 102. For example, a multi-device communication session between the first network device 102a, the second network device 102b, and the third network device 102c can include audio and video data. The second network device 102b, however, may only be able to process audio while the first network device 102a and the third network device 102c can process audio and video. The system 200 can recognize the capabilities of each device, and therefore, send the appropriate data streams to each device.

In particular, in the above example, the second network device would only receive the audio data stream from the first and the third network devices. However, the first and third network devices receive a data stream with audio and video data from each other, as well as the audio data stream from the second network device. In this way, the system 200 can cause the appropriate audio and video data streams to be sent independently between each network device 102 to accommodate the capabilities of each network device 102 sharing in the multi-device communication session.

Figure 3:
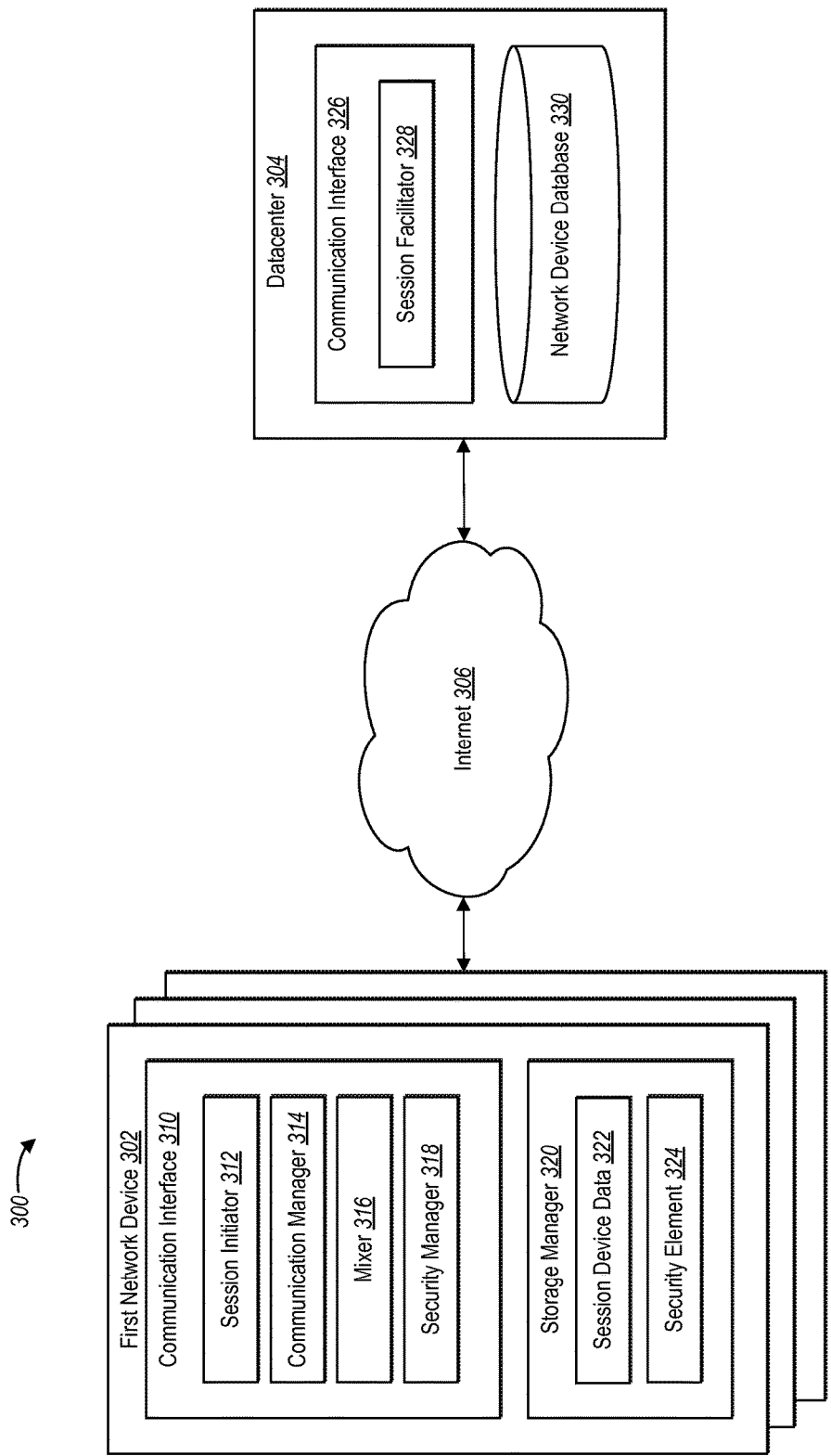
FIG. 3 illustrates an exemplary network-based communication system in accordance with one or more embodiments disclosed herein.

FIG. 3 illustrates an exemplary network-based communication system 300 (hereafter "system 300") according to principles described herein. The system 300 may be one example configuration of the system 100 described in connection with FIG. 1 and/or the system 200 described in connection with FIG. 2. For instance, the network device 302 may be one exemplary embodiment of one of the network device 102a-c. Likewise, the datacenter 304 may be an exemplary embodiment of the datacenters 104 described in connection with FIG. 1.

As illustrated, the system 300 includes one or more network devices 302, and a datacenter 304. For ease of explanation, the system 300 is described as having a network device 302 and a datacenter 304. However, the principles described with respect to FIG. 3 can be implemented within a system 300 having any number of network devices 302 and datacenters 304.

The network device 302 may connect to the datacenter 304 via the Internet 306. In some configurations, the network device 302 may be directly connected to the datacenter 304, for example, over a private network. In addition, the network device 302 may securely connect to the datacenter 304 via a secure connection, for example, using secure sockets layer ("SSL") protocol, or another cryptographic protocol.

In some configurations, the network device 302 may be a VoIP device. The network device 302 may allow a user to communicate with other network devices. For instance, the network device 302 may facilitate voice and data communication sessions between users. The network device 302 may also allow a user to modify preferences and access voice-messages, each of which may be stored at a datacenter 304 or on a remote server. In addition, as described above, users may communicate with each other using additional forms of communication provided by the network device 302, such as a videoconference.

The network device 302 includes a communication interface 310. The network device 302 may also include input and output audio/video functionality as described below in connection with FIG. 10. For example, as described in detail below, the network device 302 may be a dedicated device, or a soft device, such as a dedicated VoIP device.

The network device 302 employs a communication interface 310 to transmit and receive data. For example, the communication interface 310 may transmit or receive queries, requests, acknowledgements, signals, indications, etc., between the network device 302, other network devices, and/or the datacenter 304. For example, the communication interface 310 may facilitate a multi-device communication session between network devices.

As illustrated, the communication interface 310 may include a session initiator 312, a communication manager 314, a mixer 316, and a security manager 318. In general, the session initiator 312 facilitates communications between users, such as a multi-device communication session. The communication manager 314 monitors communication as well as sends and receives data streams between other network devices in a multi-device communication session. The mixer 316 combines data streams received from other network devices in a multi-device communication session. The security manager 318 negotiates a security element between network devices in a multi-device communication session. Additional detail regarding each component of the communication interface 310 is discussed in detail below.

One of skill in the art should note that each of the above components may be independent from the communication interface 310. For example, the session initiator 312 may be a separate module on the network device 302. In addition, one or more of the above listed components included in the communication interface 310 may be located outside of the network device 302. For example, in some configurations, the mixer 316 may be located on a remote computing device, such as on customer premises equipment, or on the datacenter 304.

In particular, in one or more example embodiments, the mixer and/or distributor may be physically located at the datacenter. When located at the datacenter, however, the datacenter 304 would include multiple mixers/distributors such that each mixer/distributor would be associated with a single network device 302 during a multi-device communication session, and would therefore function as described above with respect to FIG. 2, as well as described below with respect to FIG. 3. In one or more embodiments the mixer and distributor can be located on the same device. Alternatively, the mixer may be located on a separate device from the distributor.

Referring again to FIG. 3, and as briefly described above, the session initiator 312 facilitates communications between users via the network device 302. In general, the session initiator 312 may initiate audio, video, instant messages, and other types of communication sessions between one or more users associated with network devices. The session initiator 312 may employ protocol, such as SIP, in facilitating communication sessions. Further, the session initiator 312 can facilitate multi-device communication session between the network device 302 and two or more other network devices.

In one or more embodiments, the session initiator 312 can receive a request to initiate a multi-device communication session. For example, a user may indicate a desire to communicate with other users in a conference call via the network device 302. The request from the user can include identification information for other users with whom the user desires to communicate, which the session initiator 312 can use to establish the multi-device communication session.

In one or more embodiments, the session initiator 312 can communicate with the session facilitator 328 on the datacenter 304 to set up a multi-device communication session. For example, the session initiator 312 can obtain contact information from the session facilitator 328 on the datacenter 304, such as phone numbers or address information, used to contact the other devices. Alternatively, as described in greater detail below, the session initiator 312 can send the user request, or a portion of the user request to the session facilitator 328 on the datacenter 304 and the session facilitator 328 can set up a multi-device communication session.

Upon receiving contact information from the datacenter 304 for the other network devices requested to join the multi-device communication session, the session initiator 312 can contact the network devices. For example, the session initiator 312 can establish a connection with each network device associated with users who are participating in the multi-device communication session using the contact information the session initiator 312 receives from the datacenter 304.

In some example embodiments, the session initiator 312, and/or the session facilitator 328 on the datacenter 304, can use a multiple phase commit process to setup a multi-device communication session between the network devices. For example, the session initiator 312 can use a two phase commit process with the other network devices in the multi-device communication session to ensure that each network device is available and ready to participate in the multi-device communication session. Additional information regarding a two phase commit process will be described below in connection with FIGS. 6A-6C.

In one or more embodiments, the session initiator 312 can facilitate the addition or removal of network device in a multi-device communication session. For example, a first network device and a second network device can be in a communication session, when a third network device requests to join the communication session. The session initiator 312 can connect the three network devices and can establish a multi-device communication session between the three network devices. Adding and removing network devices from a multi-device communication session will be described below in connection with FIG. 4.

As mentioned above, the communication manager 314 monitors communication as well as sends and receives data streams. In particular, the communication manager 314 can send data streams to other network devices with which the network device is communicating. For example, if the network device 302 is participating in a multi-device communication session, the communication manager 314 can send a data stream to the other network devices in the multi-device communication session, for example, via a duplicator 206, as described above in connection with FIG. 2. Alternatively, in some instance, the communication manager 314 can serve as a duplicator and can send copies of the data stream to each network device in the multi-device communication session.

The communication manager 314 can also receive data streams from other network devices. For example, the communication manager 314 can receive one or more data streams from each network device with which the network device 302 is in a multi-device communication session. For instance, if a user using the network device is part of a conference call with five of other users, the communication manager 314 can receive five data streams corresponding to the five other users. In addition, after the communication manager 314 receives one or more data streams, the communication manager 314 can provide the data stream to the mixer 316, described below.

In one or more embodiments, the communication manager 314 can monitor connections with other network devices during a multi-device communication session. For example, the communication manager 314 can monitor the connection quality and status associated with data streams the communication manager 314 receives from other network devices in a multi-device communication session. For instance, the communication manager 314 can detect when another network device is disconnected from the multi-device communication session, e.g., when a data stream associated with the other network device gets cut off.

In some embodiments, the communication manager 314 can detect when faults or connection interruptions occur at the network device 302. For example, the communication manager 314 can detect that one of the other network devices in the multi-device communication session is not receiving the data stream being sent from the network device 302. Similarly, the communication manager 314 can monitor when the quality of a connection with another network device or a datacenter 304 is declining.

When the quality of a connection is poor, or when a connection between another network device becomes disconnected or cut off, the communication manager 314 can attempt to reconnect with the other network device using an alternate connection. For example, if the communication manager 314 detects that the quality of the multi-device communication session weakens below a threshold value, the communication manager 314 can request that the datacenter 302 provide an alternate media connection bridge between the network devices in the multi-device communication session.

In some cases, the communication manager 314 may need to communicate with a second datacenter to obtain improved connections. For example, if the original datacenter 302 becomes unavailable or if the connection quality with the datacenter 304 weakens below a threshold, the network device 302 can connect to a second datacenter 304. For instance, the network device 302 can switch communications to the second datacenter during a multi-device communication session, often without being disconnected from the multi-device communication session. The network device 302 can then communicate with the second datacenter to obtain improved connections.

In some example embodiments, the communication manager 314 can save information corresponding to each network device participating in a multi-device communication session. For example, the communication manager 314 can store session device data 322 in a storage manager 320. Session device data 322 can include connection information for each network device in the multi-device communication session, such as the address of each network device as well as an identifier corresponding to each network device. As such, if the network device 302 does become temporality disconnected from one or more network devices in a multi-device communication session, the communication manager 314 can use the session device data 322 to reconnect to each network device. The communication manager 314 can also use the session device data 322 to verify the identity of a network device that was temporarily disconnected from a multi-device communication session with the network device 302.

As mentioned above, the communication manager 314 can provide one or more data streams to the mixer 316. For example, the communication manager 314 can provide both the data stream being sent from the network device 302 and data streams received at the network device 302 while the network device 302 is in a multi-device communication session.

In one or more embodiments, the mixer 316 can combine multiple data streams into a combined data stream. The mixer 316 can then provide the combined data stream to a user using the network device 302. For example, if four users are participating in a conference call, the mixer 316 can combine the audio of the user with audio streams from the three other users, and present the combined audio stream to the user, e.g., via a speaker associated with the network device 302.

In one or more embodiments, the mixer 316 can dynamically equalize data streams. For example, the mixer 316 can normalize the volume of each audio stream in a conference call. Further, the mixer 326 can filter out unwanted interference, or even one or more users in a multi-device communication session. For example, the mixer 316 can detect which user is actively talking in a conference call and which users are listening (e.g., not talking) Then, the mixer 316 can increase the volume of the active user while muting or reducing the volume of other users in the conference call. Further, in one or more embodiments, rather than processing or combining each data stream, the mixer 316 can provide only the active data stream to the user.

In some embodiments, the mixer 316 can be located at or near the datacenter 304. For example, a mixer 316 that serves the network device 302 can be located on network servers tied to the datacenter 304. Alternatively, the mixer 316 can be located on a network server distributed within the system 300.

In one or more embodiments, a mixer 316 can serve as a mixer for multiple network devices 302. For example, multiple network devices 302 can be located in an office environment. In this example, the mixer 316 can be located on customer premises equipment. The mixer 316 on the customer premises equipment can mix incoming data stream for each network device 302 in the office environment. For example, there may be two network devices located in the office that are participating in two different multi-device communication sessions. In such an instance, the mixer in the customer premises equipment can receive the data streams associated with each of the different multi-device communication session, and then distribute the data streams to the appropriate network devices within the office. Alternatively, the customer premises equipment may include multiple mixers 316 such that each of the data streams associated with the different multi-device communication sessions are processed through separate mixers 316.

In one or more embodiments, the mixer 316 can be located near a duplicator. For example, each network device 302 can use a mixer 318 and a duplicator. The mixer 316 and the duplicator can be located on the network device 302 or located outside of the network device 302. For example, the mixer 316 and the duplicator can be located on a network server in the system 300. In some example embodiments, the mixer 316 and the duplicator can be tied to the datacenter 304. In addition, the mixer 316 and duplicator can be integrated into a single device, such as on the network device 302, customer premises equipment, or datacenter. Although the physical location of the mixer 316 and duplicator may vary, the function of the mixer 3106 and duplicator is essentially the same as described herein.

As mentioned above, the security manager 318 can negotiate a security element between network devices in a multi-device communication session. For example, the network devices participating in a multi-device communication session can negotiate and authorize a shared security element exclusive to the network devices in the multi-device communication session. When a network device is added or removed from the multi-device communication session, the network devices in the multi-device communication session can negotiate a new security element. In this manner, unauthorized network devices or other electronic device cannot access the multi-device communication session.

The security manager 318 can store one or more security elements 324 in the storage manager 320. For example, the security manager 318 can negotiate an encryption key with three other network devices before establishing a multi-device communication session. When one of the network devices drops out, the remaining network devices can negotiate a new shared security element 324. In addition, the network devices can resume using a previous shared security element 324 if a network device that previously dropped out reconnects. Additional detail regarding negotiating and using security elements is described below in connection with FIGS. 4 and 5.

Returning to FIG. 3, the system 300 includes a datacenter 304. The datacenter has a communication interface 326, which includes a session facilitator 328 and a network device database 330. The communication interface 326 may communicate with the communication interface 312 located on the network device 302. For example, as described above, the session initiator 312 can send a request, or portion thereof, to the session facilitator 328 on the datacenter 304 to establish a multi-device communication session.

In some embodiments, the session facilitator 328 can use the information in a request to set up a multi-device communication session. For example, as described above, the session facilitator 328 can provide address information to the network device 302 corresponding to users identified in the request. For instance, the session facilitator 328 can identify address information corresponding to network devices in the network device database 330 corresponding to each network device identified in the request, as described above (e.g., providing an IP address in response to receiving a telephone number).

Alternatively, the session facilitator 328 can establish a multi-device communication session in response the request from the network device 302. For example, the session facilitator 328 can identify address information corresponding to network devices identified in the request from the network device database 330 and can establish connections with each corresponding network device. The session facilitator 328 can then establish a multi-device communication session between the network devices identified in the request. Upon establishing the multi-device communication session, the session facilitator 328 can withdraw support of the multi-device communication session, allowing the multi-device communication session to operate through the network devices participating in the multi-device communication session.

In some example embodiments, while the datacenter 304 withdraws support of a multi-device communication session once the multi-device communication session is established, the datacenter 304 can continue to monitor the status of the multi-device communication session. For example, the datacenter 304 can still send signaling protocol messages between each network device participating in the multi-device communication session. Further, the datacenter 304 can set up one or more alternative media bridge connections between network devices in a multi-device communication session. The datacenter 304, however, no longer receives and processes data streams from the network devices when the network devices are in a multi-device communication session.

Figure 4:
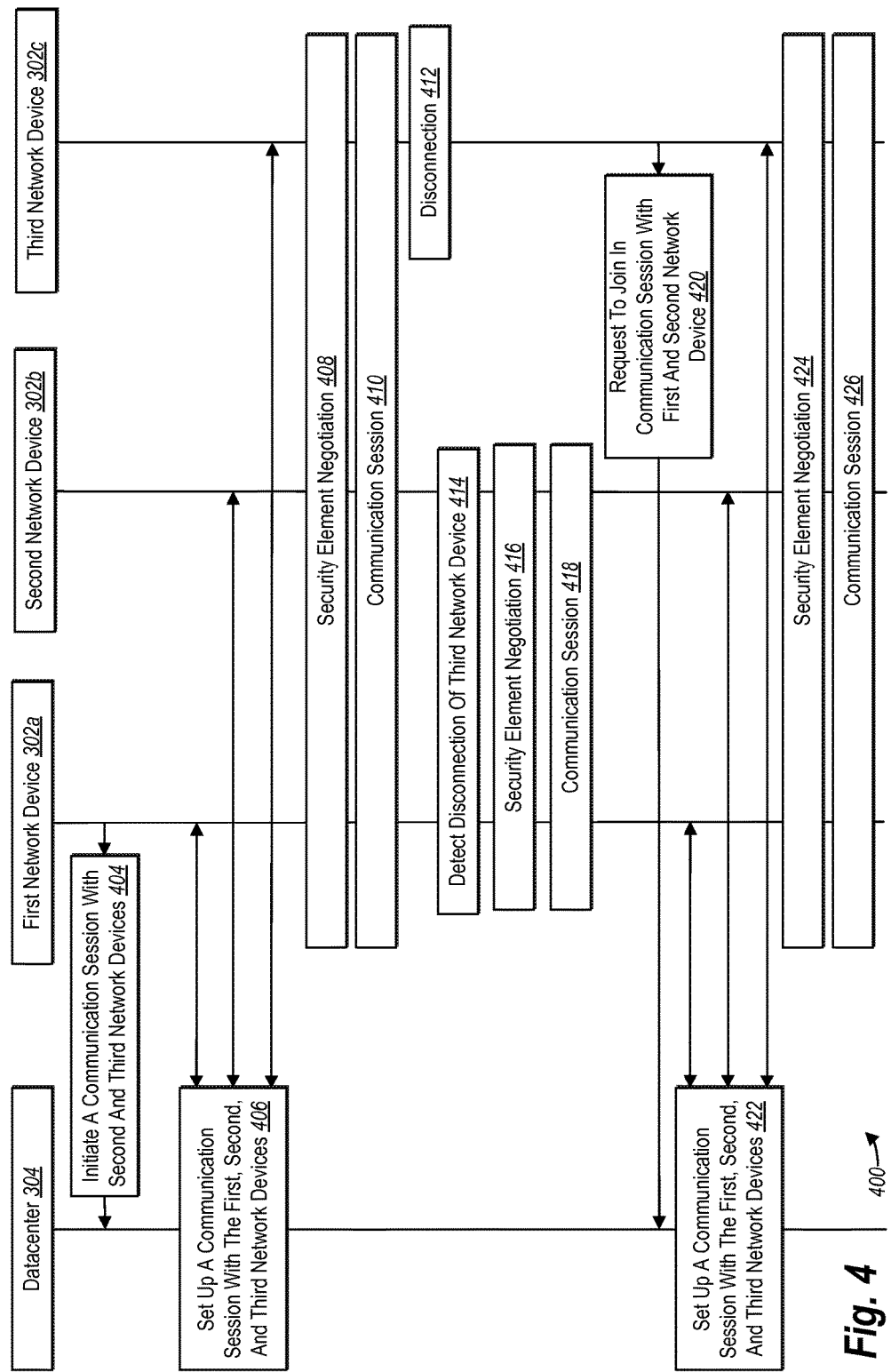
FIG. 4 illustrates a sequence-flow diagram illustrating interactions between a datacenter, a first network device, a second network device, and a third network device in accordance with one or more embodiments disclosed herein.

FIG. 4 illustrates a sequence-flow method 400 illustrating interactions between a datacenter 304, a first network device 302a, a second network device 302b, and a third network device 302c (or collectively "network devices 302") in the network-based communication system 300 of FIG. 3 in accordance with one or more embodiments disclosed herein. The method 400 of FIG. 4 illustrates an example method of the first network device 302a facilitating a multi-device communication session. In particular, the method 400 of FIG. 4 includes the first network device 302a facilitating the negotiation of security elements, removing a network device, and adding a network device to a multi-device communication session.

To illustrate, in step 404, the first network device 302a sends a request to the datacenter 304 to initiate a communication session, such as a multi-device communication session, with the second network device 302b and the third network device 302c. For example, a first user using the first network device 302a may request to call users associated with the second network device 302b and the third network device 302c. The first network device 302a can receive the user request and send the request, or a portion of the request, to the datacenter 304.

In step 406, the datacenter 304 can set up a communication session, such as a multi-device communication session, with the first network device 302a, the second network device 302b, and the third network device 302c. As described above, in some embodiments, the first network device 302a can provide the user request to the datacenter 304, and the datacenter 304 can create a multi-device communication session between the network devices 302.

In creating and setting up a communication session, the datacenter 304 can communicate with each of the first network device 302a, the second network device 302b, and the third network device 302c to determine the availability of each network device 302. In particular, as described in greater detail below in connection with FIG. 6A, the datacenter 304 can commit each network device 302 to a communication session.

Once the datacenter 304 sets up, or assists in setting up, a communication session, the datacenter 304 can withdraw from actively participating in the communication session. In other words, the network devices 302 can facilitate the communication session without requiring data streams from each network device 302 to pass through the datacenter 304. In some example embodiments, even when data streams are not passing through the datacenter 304, the datacenter 304 can monitor the status of the communication session between the network devices, as described above. For example, the datacenter 304 can monitor which network devices 302 are participating in the communication session, when a network device 302 becomes disconnected, and when the communication session ends. For example, the monitoring of the communication session can take place through SIP protocol that allows status data and messages to be sent separate from the media streams.

In one or more embodiments, the first network device 302a can negotiate a shared security element with the second network device 302b and the third network device 302c, as illustrated in step 408. As described above, each network device 302 participating in the communication session can negotiate a shared security element, such as a cryptography key, between each other to prevent unauthorized access to the communication session. In one or more embodiments, the security element negotiation is accomplished by the first network device 302a generating a security key, and sending the security key to the second network device 302b and the third network device 302c. Devices that attempt to join the communication session will have to have the security key corresponding to the particular communication session, and upon failure to provide a correct security key, the device will be denied access to the communication session.

In addition, the first network device 302a, the second network device 302b, and the third network device 302c can encrypt data streams using the shared security element. Further, when a data stream is received, each network devices can use the shared security element to decrypt the received data stream. In some embodiments, if a data stream is received at a network device 302 that is not encrypted after the network device 302 authorizes a shared security element, the network device 302 can disregard the data stream. In this manner, each network device 302 can ensure that communications between each other are authorized and are part of a communication session, which is shown in step 410.

In step 412, the third network device 302c disconnects from the communication session. For example, the third network device 302c hangs up to disconnect from the conference call. In some example embodiments, the third network device 302c can send an indication to the datacenter 304, the first network device 302a, and/or the second network device 302b when disconnecting from the communication session.

As illustrated in step 414, the first network device 302a and/or the second network device 302b can detect that the third network device 302c has disconnected from the communication session. For example, the second network device 302b can detect that the third network device 302c has stopped sending data streams. Alternatively, the third network device 302c or the datacenter 304 can inform the first network device 302a and/or the second network device 302b of the disconnection.

In step 416, the first network device 302a and the second network device 302b can negotiate a new security element. In particular, when the first network device 302a and/or the second network device 302b detects that the third network device 302c disconnects from the communication session, the first network device 302a and the second network device 302b can negotiate a new security element. In this manner, either the third network device 302c or an electronic device spoofing to be the third device cannot later gain access to the communication session between the first network device 302a and the second network device 302b, shown as step 418.

In step 420, the third network device 302c, or another network device 302, can request to join the communication session with the first network device 302a and the second network device 302b. For example, the third network device 302c can send a request to the datacenter 304 to join the communication session. Alternatively, the third network device 302c can send the request the first network device 302a and/or the second network device 302b. For example, the third network device 302c may simply try to place a call with the first network device 302a while the first network device 302a is participating in the communication session 418. The user associated with the first network device 302a can recognize the call from the third network device 302c, and can take appropriate user action to merge the call from the third network device 302c into the communication session (e.g., select a merge call option using the first network device 302a).

In step 422, the datacenter 304 can again set up a communication session with the first network device 302a, second network device 302b, and/or third network device 302c, in a similar manner as described above. Also, as described above, the first network device 302a, the second network device 302b, and the third network device 302c can negotiate a new security element, as shown in step 424, to use in a communication session, such as a multi-device communication session, which is shown in step 426.

Accordingly, as illustrated in method 400, network devices can be added and/or removed from a communication session. In some embodiments, a datacenter 304 can assist in setting up communication session between a group of network devices 302. Alternatively, in some embodiments, the group of network devices 302 can facilitate a communication session with little or no support from the datacenter 304. Further, when participating in a communication session, such as a multi-device communication session, the network devices 302 can send data streams between each other without using a datacenter 304.

Figure 5:
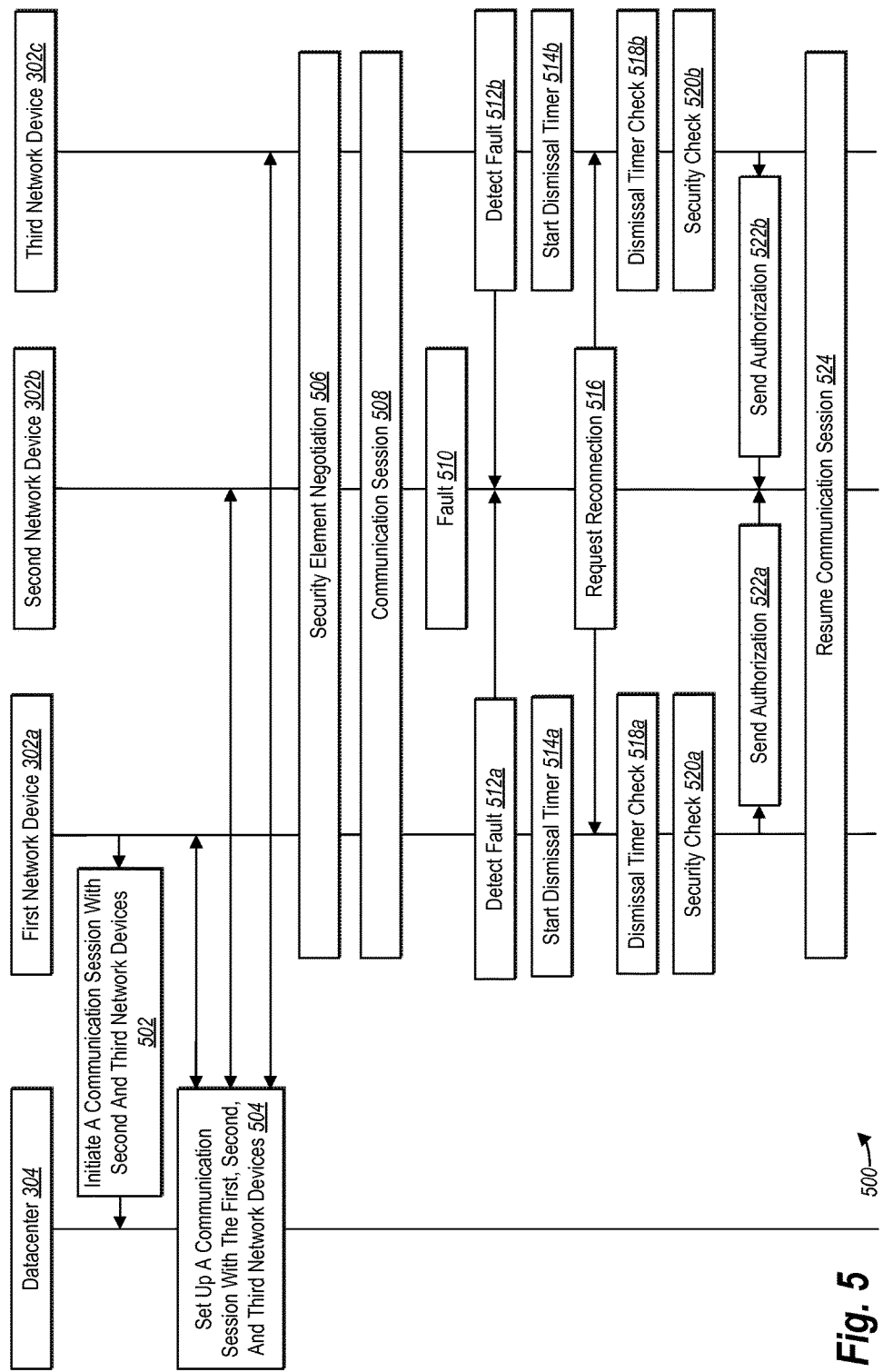
FIG. 5 illustrates another sequence-flow diagram illustrating interactions between the datacenter, the first network device, the second network device, and the third network device in accordance with one or more embodiments disclosed herein.

FIG. 5 illustrates another sequence-flow method 500 illustrating interactions between a datacenter 304, a first network device 302a, a second network device 302b, and a third network device 302c (or collectively "network devices 302") in the network-based communication system 300 of FIG. 3. The method 500 of FIG. 5 illustrates an example method of the first network device 302a facilitating a multi-device communication session. In particular, the method 500 of FIG. 5 includes the a network device 302 detecting the temporary disconnection and reconnection of another network device participating in a multi-device communication session.

To illustrate, in step 502 the first network device 302a sends a request to the datacenter 304 to initiate a communication session, with the second network device 302b and the third network device 302c, as described above. Also, as described above, the datacenter 304 can set up a communication session, such as a multi-device communication session, with the first network device 302a, the second network device 302b, and the third network device 302c, shown in step 504.

In step 506, the first network device 302a, second network device 302b, and the third network device 302c can negotiate a shared security element. Each network device can store the shared security element, as described above. Upon negotiating a share security element, the first network device 302a, second network device 302b, and third network device 302c, can participate in a communication session, such as a multi-device communication session, shown in step 508.

In step 510, the second network device 302b can suffer from a connection fault. For example, the network connection to the second network device 302b may disconnect. In another instance, the datacenter 304 can lose contact with the second network device 302b. In addition, noise and interference can interrupt data streams from the second network device 302b to the first network device 302a and/or the third network device 302c. One will appreciate that a number of factors can contribute to the fault of the second network device 302b from the communication session.

As illustrated in step 512, the first network device 302a and/or the third network device 302c can detect that the second network device 302b has disconnected from the communication session. Alternatively, the datacenter 304 can inform the first network device 302a and/or the third network device 302c of the disconnection.

In response, the first network device 302a and the third network device 302c can start a dismissal timer, shown in step 514. The dismissal timer can track the length of time a network device 302, which was part of a communication session, has been disconnected from the communication session. For example, when the third network device 302c detects that the second network device 302b has disconnected from the communication session, the third network device 302c can start a dismissal timer. The first network device 302a can similarly start a dismissal timer on the first network device 302a upon detecting that the second network device 302b in no longer communicating with the first network device 302a.

In step 516, the second network device 302b can request reconnection to the communication session with the first network device 302a and the second network device 302b. The request may be sent directly to the other network devices 302 without first being processed by the datacenter 304. For example, the second network device 302b can suffer a fault, disconnect from the system 300 and in turn disconnect from the communication session, then later reconnect to the system 300 and request reconnection to the communication session directly to the network devices in the communication session.

As another example, the second network device 302b can lose connection with the system 300 when the connection between the second network device 302b and the datacenter 304 fails or weakens. In response, the second network device 302b can connect to an alternate datacenter. The second network device 302b can then request to rejoin to the communication session with the first network device 302a and the second network device 302b upon reconnecting to the system 300 via the alternate datacenter.

In one or more embodiments, the second network device 302b can automatically request to rejoin the communication session. For example, upon disconnecting from the communication session, when the user associated with the second network device 302b did not indicate a disconnection, the second network device 302b can send a request to the first network device 302a and/or the second network device 302b to rejoin the communication session. In this way, the second network device 302b may actually be dropped from the communication session, and rejoin the communication session, so quickly that none of the users participating in the communication session even notice that the second network device 302b was dropped from the communication session. Thus, the reliability of the communication session increases significantly over conventional methods by using the methods and systems described herein.

In one or more embodiments, a network device 302 can use session device data 322 stored in a storage manager 330 to recall the state and address of other network devices participating in the communication session. For example, the second network device 302b can lookup the address and state of the first network device 302a and the third network device 302c when attempting to reconnect to the communication session. In this manner, the second network device 302b can request to reconnect directly to the communication session without the assistance of a datacenter 304.

In step 518, the first network device 302a and the second network device 302b can check the dismissal timer upon receiving the reconnection request from the second network device 302b. If the elapsed time on the dismissal timer is below a predetermined value, the first network device 302a and the third network device 302c can perform a security check, as shown in step 520. Otherwise, the first network device 302a and/or the third network device 302c can deny the reconnection request if the dismissal timer has met or surpassed the set value. For example, if the dismissal time is over ten (10) seconds on the first network device 302a, the first network device 302a can deny the reconnection request from the second network device 302b.

As mentioned above, in step 520, the first network device 302a and the third network device 302c can perform a security check. For example, in some example embodiments, the reconnection request can include the shared security token along with the identifier of the second network device 302b. The first network device 302a and/or third network device 302c can use the shared security element and/or identifier of the second network device 302b to authorize the second network device 302b to rejoin the communication session. For instance, the first network device 302a can compare the shared security element and/or identifier of the second network device 302b with corresponding information stored in the storage manager 330 of the first network device 302a.

In step 522, the first network device 302a and/or the third network device 302c can send an authorization to the second network device 302b to rejoin the communication session, which is shown in 522. In this manner, method 500 allows a network device to reconnect to a communication session upon temporary loss or disconnection from a communication session. For example, a user can be on a conference call with a number of other users. Due to a connection error, the user can be disconnected from the communication session and need to rejoin in the conference call. The network device can automatically request to join the conference call and can reconnect to the call without needing to perform any additional step so long as the call is within a specified time period. Further, in some embodiments, the disconnected network device can send the rejoin request to any network device participating in the conference call because each network device can authorize the disconnected network device to rejoin the conference call.

Figure 6A:
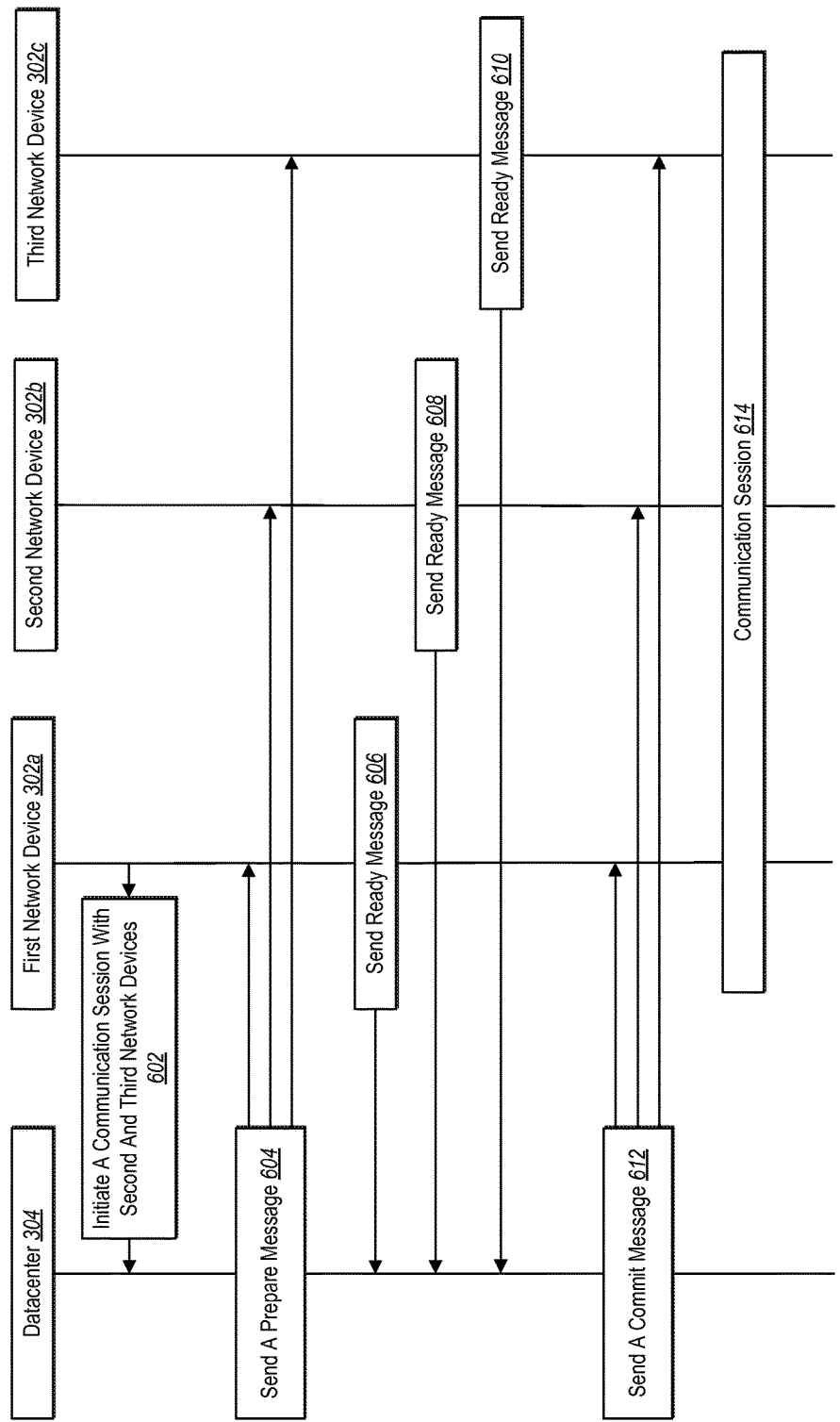
FIGS. 6A-6C illustrate sequence-flow diagrams illustrating interactions between the datacenter, the first network device, the second network device, and the third network device in accordance with one or more embodiments disclosed herein.
Figure 6B:
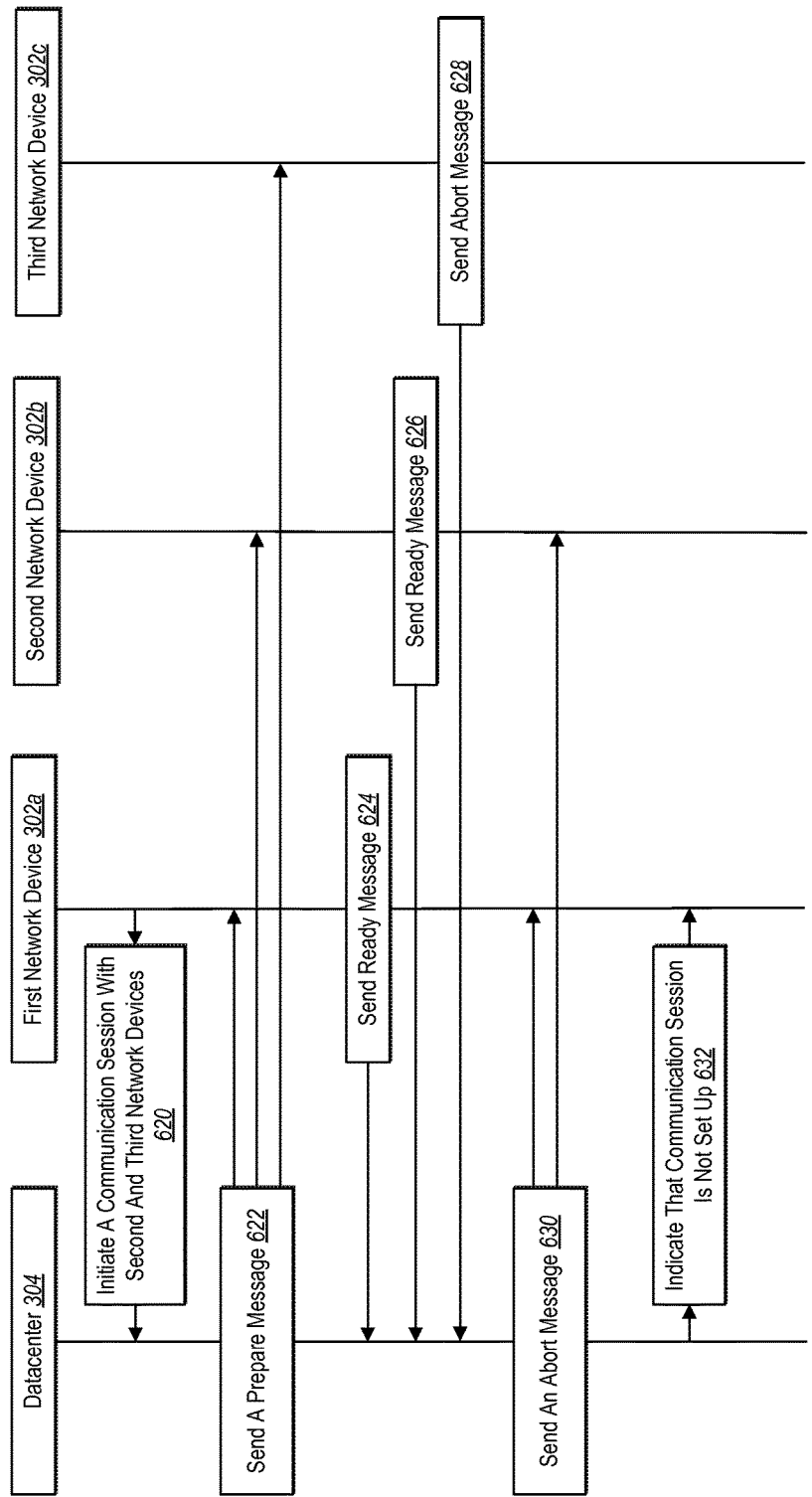
Figure 6C:
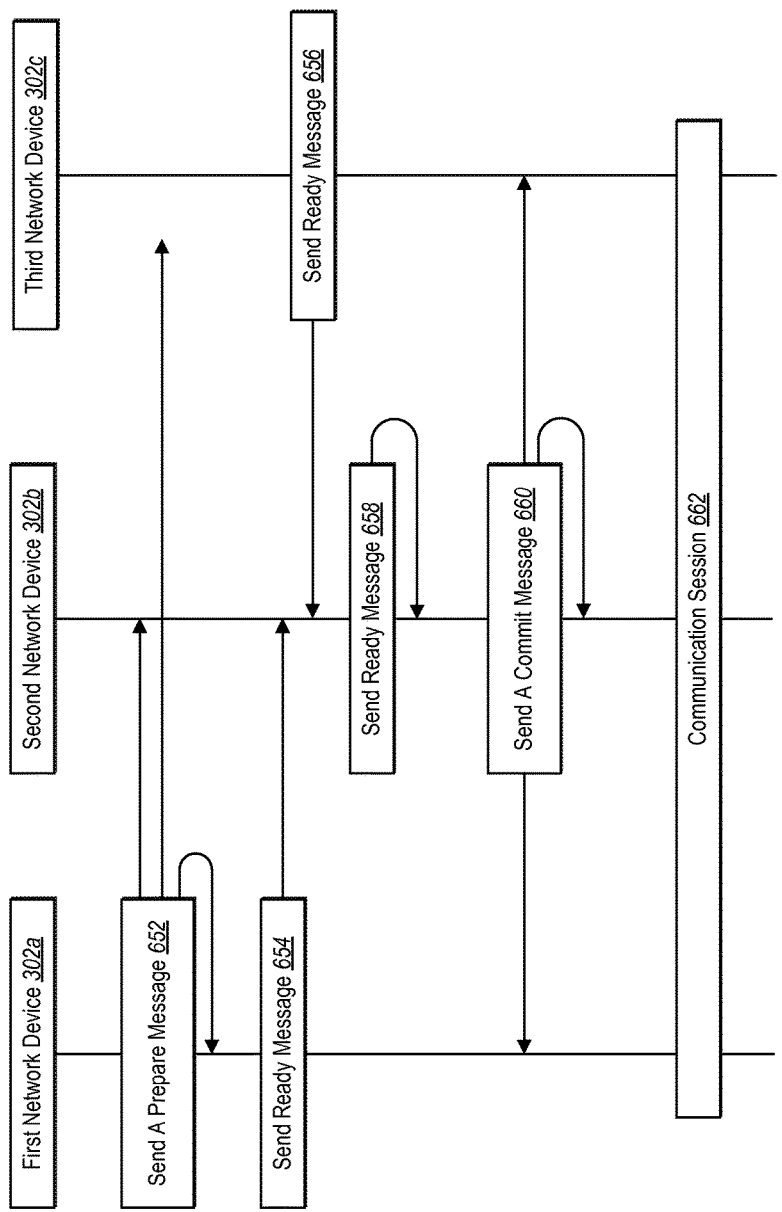

FIGS. 6A-6C illustrates various methods 600, 640, and 650 of establishing a multi-device communication session in accordance with one or more embodiments disclosed herein. Methods 600, 640, and 650 can include interactions between a datacenter 304, a first network device 302a, a second network device 302b, and a third network device 302c, (or collectively "network devices 302") in the network-based communication system 300 of FIG. 3.

For example, method 600 in FIG. 6A illustrates committing a group of network devices 302 to a multi-device communication session. To illustrate, step 602 includes the first network device 302a sending a request to the datacenter 304 to initiate a communication session, as described above.

In response, the datacenter 304 can set up a communication session with the first network device 302a, the second network device 302b, and the third network device 302c. In particular, the datacenter 304 can send a prepare message to the first network device 302a, the second network device 302b, and the third network device 302c, as shown in step 604. The prepare message can inform the network devices 302 that the network devices 302 are invited to join a multi-device communication session. In a two phase commit process, sending a prepare message is part of the first phase.

Each of the first network device 302a, the second network device 302b, and the third network device 302c can respond to the prepare message. For example, if the first network device 302a is ready and capable to participate in a multi-device communication session, the first network device 302a can respond to the prepare message with a ready message, as shown in step 606. Similarly, the second network device 302b and the third network device 302c can send ready messages to the datacenter 304 if the second network device 302b and the third network device 302c are also ready. Sending the ready message completes the first phase of the two phase commit process.

In step 612, the datacenter 304 can send a commit message to the first network device 302a, the second network device 302b, and the third network device 302c when the datacenter 304 receives ready messages from every network device 302 participating in the multi-device communication session. The commit message can indicate to the network devices that every network device in the communication session is ready to participate in the multi-device communication session. The commit message is part of the second phase in the two phase commit process.

In step 614, the first network device 302a, the second network device 302b, and the third network device 302c can participate in a multi-device communication session. As described above, after the datacenter 304 sets up the multi-device communication session, the datacenter 304 can withdraw support and allow the network devices to facilitate the multi-device communication session. Sending the commit message completes the second phase of the two phase commit process.

In some instances, the datacenter 304 may fail to set up a multi-device communication session, as described in method 640 in connection with FIG. 6B. For example, in step 620, the first network device 302a can send a request to the datacenter 304 to initiate a communication session, as described above. In addition, as described above, the datacenter 304 can send a prepare message to the first network device 302a, the second network device 302b, and the third network device 302c, as shown in step 622.

One or more network devices may not be ready. For example, one of the network devices 302 can be in use, offline, or unattended. To illustrate, steps 624 and 626 include the first network device 302a and the second network device 302b sending ready messages. In step 628, however, the third network device 302c may send an abort message indicating that the third network device 302c is not ready. For example, the third network device 302c can send an abort message because the third network device 302c cannot support the requested type of multi-device communication session. For instance, the third network device 302c can lack processing resources (e.g., CPU power and/or memory) or a required CODEC. Alternatively, the third network device 302c may send no response to the prepare message from the datacenter 304, and the datacenter 304 can infer an abort message after a period of time passes since sending the prepare message.

If one of the network devices 302 is not ready, the datacenter 304 can send an abort message to each of the remaining network devices 302. For example, the datacenter 304 can send an abort message to the first network device 302a and the second network device 302b, shown in step 630. In addition, in step 632, the datacenter 304 can inform the first network device 302a that the communication session could not be set up. Alternatively, the datacenter 304 can commit the ready network devices to a multi-device communication session and inform the ready network devices of any network devices that have aborted the multi-device communication session.

In one or more embodiments, one of the network devices 302 can set up the multi-device communication session. For example, the first network device 302a can perform the two phase commit process with the second network device 302b and the third network device 302c. In this manner, the datacenter 304 may serve as an address provider for the first network device 302a, but is not involved in the set up of the communication session.

Further, multiple network devices 302 can set up the multi-device communication session, as described in method 650 in connection with FIG. 6C. In particular, the first network device 302a, second network device 302b, and third network device 302c can perform a distributed two phase commit process.

In step 652, the first network device 302a can send a prepare message to the first network device 302a, the second network device 302b, and the third network device 302c, as describe above. In some embodiments, the first network device 302a can send a prepare message to itself. Alternatively, the first network device 302a can skip sending a prepare message to itself (e.g., the first network device can send the prepare message to the second network device 302b and the third network device 302c after confirming that it is prepared).

After receiving the prepare message, the first network device 302a can perform a check to verify the first network device 302a is available and capable to join a multi-device communication session. After performing the validation check, the first network device 302a can send a ready message to the second network device 302b, as shown in step 654. In some embodiments, because the first network device 302a is sending the prepare message, the first network device 302a can verify that it is prepared before sending the prepare message to the second network device 302b and the third network device 302c. In this instance, the first network device 302a can send a ready message to the second network device 302b and/or third network device 302c with or directly after sending the prepare message.

Similarly, the second network device 302b and the third network device 302c can also perform a prepare validation check. If prepared, the third network device 302c can send a ready message to the second network device 302b, as shown in step 656. In step 658, the second network device 302b can send a ready message to the second network device 302b. In some example embodiments, the second network device 302b can skip sending a ready message to itself.

In step 660, the second network device 302b can send a commit message to the first network device 302a, the second network device 302b, and the third network device 302c when the second network device 302b receives ready messages from every network device 302 participating in the multi-device communication session, as described above. Upon receiving the commit messages, as shown in step 662, the first network device 302a, the second network device 302b, and the third network device 302c can participate in a multi-device communication session.

By distributing the two phase commit process, the network devices 302 can complete a two phase commit process more quickly. In particular, the network devices 302 can reduce network delay by distributing the two phase commit process between network devices 302 that are located in physical proximity to teach other.

As an example, if the first network device 302a is located in Los Angeles while the second network device 302b and the third network device 302c are located in London, the first network device 302a can send the prepare message to the second network device 302b and the third network device 302c. The first network device 302a can then send a ready message to the second network device 302b. In addition, the second network device 302b and the third network device 302c can send a ready message to the second network device 302b, which then commits the network devices 302 to a multi-device communication session. Because the second network device 302b and the third network device 302c in London do not need to send the ready message back to the first network device 302a in Los Angeles, the network devices 302 can accomplish the two phase commit process more quickly.

Figure 7:
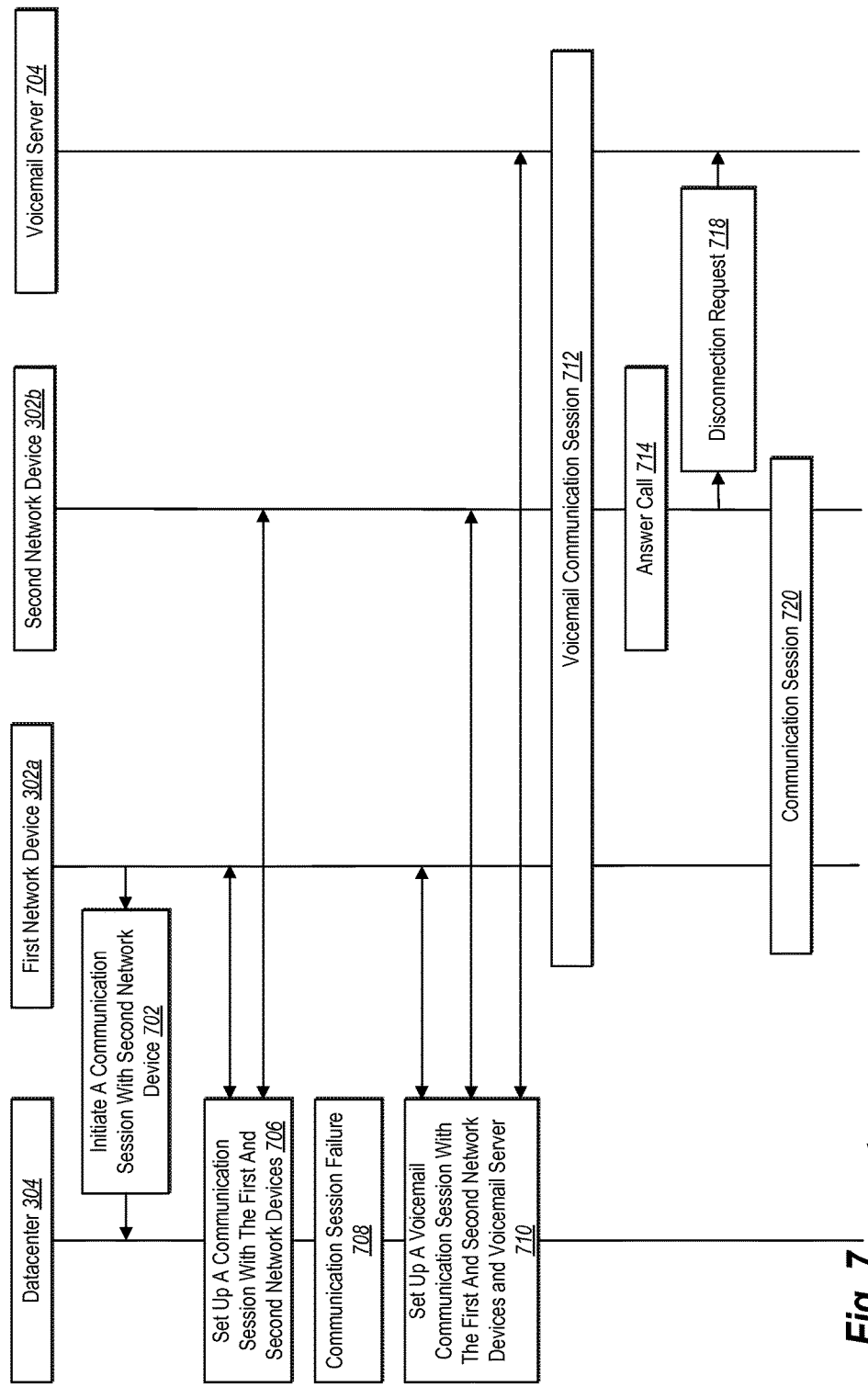
FIG. 7 illustrates a sequence-flow diagram illustrating interactions between a datacenter, a first network device, a second network device, and a voicemail server in accordance with one or more embodiments disclosed herein.

FIG. 7 illustrates a sequence-flow method 700 illustrating interactions between a datacenter 304, a first network device 302a, a second network device 302b, and a voicemail server 704 in the network-based communication system 300 of FIG. 3 in accordance with one or more embodiments disclosed herein. The voicemail server 704 can provide voicemail functionality. For example, the voicemail server 704 can play voicemail greetings, record voicemail, and replay voicemails to a user.

The method 700 of FIG. 7 illustrates an example method of establishing a multi-device communication session including a voicemail server 704. To illustrate, in step 702 the first network device 302a can send a request to the datacenter 304 to initiate a communication session with the second network device 302b. For example, a first user using the first network device 302a may request to call a user associated with the second network device 302b. The first network device 302a can receive the user request and forward the request, or a portion of the request to the datacenter 304.

In step 706, the datacenter 304 can set up a communication session with the first network device 302a and the second network device 302b. As described above, in some embodiments, the first network device 302a can provide the user request to the datacenter 304, and the datacenter 304 can create a multi-device communication session between the network devices.

As illustrated in step 708 of FIG. 7, the datacenter 304 can fail to set up the communication session. For example, a second user associated with the second network device 302b may be unavailable. As another example, the second network device 302b may be in use by the second user. For instance, the second network device 302b can send an abort message to the datacenter 304, as described above in connection with FIG. 6B.

When the datacenter 304 fails to set up a communication session between the first network device 302a and the second network device 302b, the datacenter 304 can establish a multi-device communication session between the first network device 302a, the second network device 302b, and the voicemail server 704, shown in step 710. Because the datacenter 304 knows that the second network device 302b is not ready to join a communication session, the datacenter 304 can automatically include the second network device 302b in the multi-device communication session with the voicemail server 704.

In step 712, the first network device 302a, second network device 302b, and voicemail server 704 can participate in a multi-device communication session. For example, the first user can leave a voicemail on the voicemail server 704 for the second user. In addition, the second network device 302b can play, for example, the voicemail on the second network device 302b in real time. For instance, the second network device 302b can play the voicemail on a speaker while a voicemail is being left.

In some example embodiments, the second user on the second network device 302b can answer the call, as shown in step 714. More specifically, the second user can listen to the voicemail from the first user because the second network device 302b is also part of the multi-device communication session with the first network device 302a and the voicemail server 704. As such, the second user can answer the call while the first user is leaving a message for the second user, which is being recorded on the voicemail server 704.

When the second user answers the call, the second network device 302b can request that the voicemail server 704 disconnect from the multi-device communication session, as shown in step 718. Alternatively, the voicemail server 704 can continue to record the call between the first network device 302a and the second network device 302b. Further, in some example embodiments, a user can add, as described above, a voicemail server 704 or similar server to a multi-device communication session to allow the multi-device communication session to be recorded.

In step 720, the first network device 302a and the second network device 302b can create a new communication manager 314 with each other. In particular, the first network device 302a and the second network device 302b can remove the voicemail server 704 from the multi-device communication session, as described above.

Figure 8:
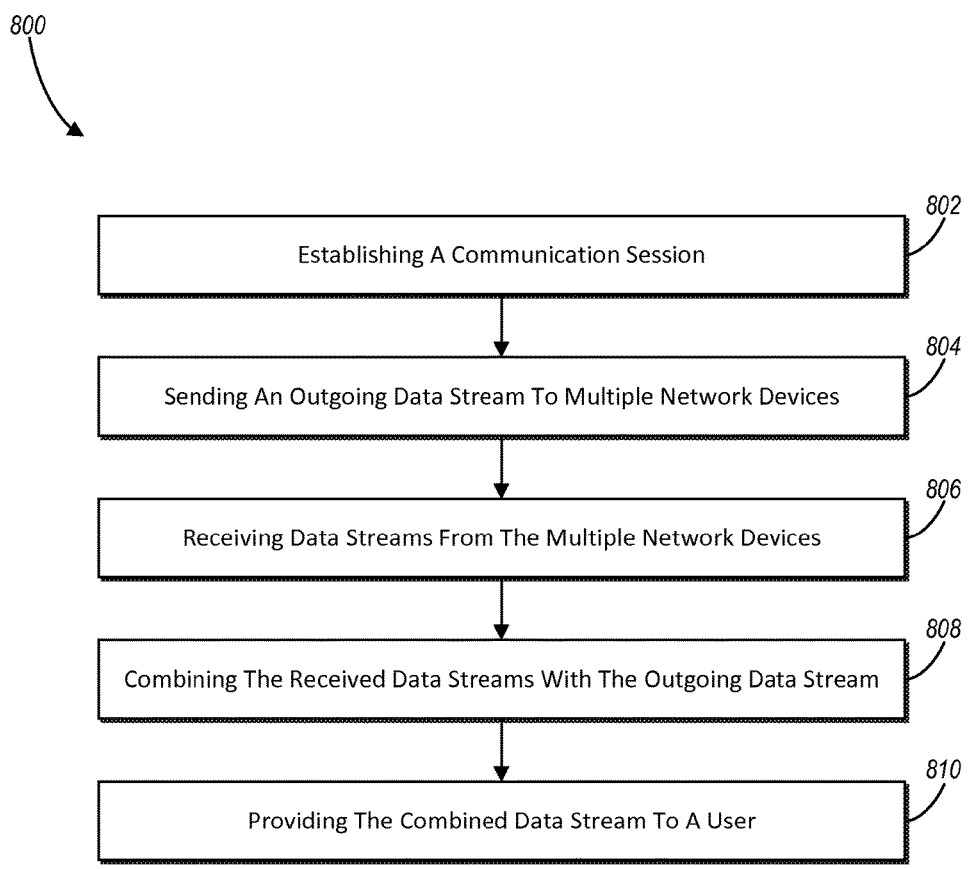
FIG. 8 illustrates an example method of facilitating a multi-device communication session on a network device in accordance with one or more embodiments disclosed herein.
Figure 9:
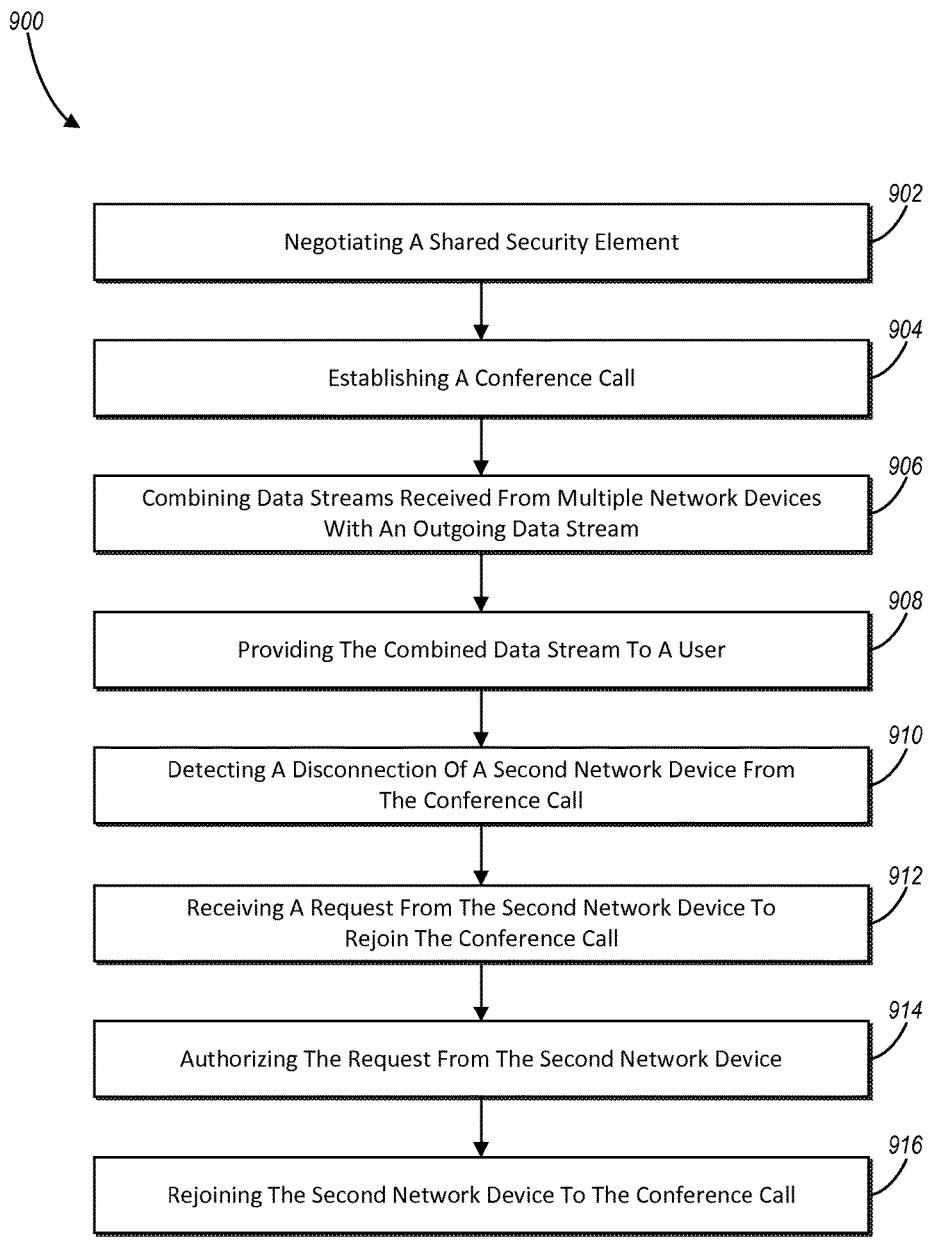
FIG. 9 illustrates another example method of facilitating a multi-device communication session on a network device in accordance with one or more embodiments disclosed herein.

FIGS. 1-7, the corresponding text, and the examples, provide a number of different systems and devices for providing a network-based communication system. In addition to the foregoing, embodiments also can be described in terms of flowcharts comprising acts and steps in a method for accomplishing a particular result. For example, FIGS. 8-9 illustrate flowcharts of example methods in accordance with one or more embodiments. The methods described in relation to FIGS. 8-9 may be performed with less or more steps/acts or the steps/acts may be performed in differing orders. Additionally, the steps/acts described herein may be repeated or performed in parallel with one another or in parallel with different instances of the same or similar steps/acts. One or more of the steps shown in FIGS. 8-9 may be performed by any component or combination of components of system 300.

FIG. 8 illustrates a flowchart of one exemplary method 800 of facilitating a multi-device communication session on a network device. Step 802 can include establishing a communication session. In particular, step 802 can include establishing a communication session between a first network device 302a and a plurality of network devices 302. For example, as described herein, the first network device 302a and/or a datacenter 304 can set up and establish a communication session, such as a multi-device communication session, between the first network device 302a and other network devices 302 such as the second network device 302b and the third network device 302c.

Step 804 can include sending an outgoing data stream to multiple network devices 302. In particular, step 804 can include sending, from the first network device 302a, an outgoing data stream to each of the plurality of network devices 302 participating in the communication session. For example, the first network device 302a can send an outgoing data stream to a duplicator 206, which in turns forwards a copy of the outgoing data stream to each network device 302 participating in the multi-device communication session, in any suitable manner as described herein. For instance, a communication manager 314 can send the outgoing data stream.

Step 806 can include receiving a data streams from the multiple network devices 302. In particular, step 806 can include receiving, at the first network device, a data stream from each network device 302 of the plurality of network devices participating in the communication session. For example, the first network device 302a can receive a data stream from each network device 302 participating in the multi-device communication session. For instance, the communication manager 314 can receive a data stream from the second network device 302b and the third network device 302c.

Step 808 can include combining the received data streams with the outgoing data stream. In particular, step 808 can include combining, at the first network device 302a, the data streams received for each network device 302 of the plurality of network devices participating in the communication session with the outgoing data stream. For example, a mixer 316 on the first network device 302a can combine the received data streams with the outgoing data stream, in any suitable manner as described herein.

Step 810 can include providing the combined data stream to a user. In particular, step 810 can include providing the combined data stream to a user associated with the first network device 302a. For example, the first network device 302a can provide the multi-device communication session to a user that is using the first network device 302a to talk to other users in the multi-device communication session (e.g., conference call).

FIG. 9 illustrates a method 900 of facilitating a conference call at a network device 302 according to the principles described herein. Step 902 can include negotiating a shared security element. In particular, step 902 can include negotiating a shared security element between a first network device 302a and a plurality of network devices 302. For example, a security manager 318 on the first network device 302a can negotiate a shared security element between the first network device 302a and the other network devices 302 invited to join the conference call, in any suitable manner as described herein. The first network device 302a can store the shared security element in a storage manager 320, for example as a security element 324. Other network devices 302 may also store the shared security element upon agreeing upon the shared security element.

Step 904 can include establishing a conference call. In particular, step 904 can include establishing a conference call in a network environment between the first network device 302a and the plurality of network devices 302. For example, as described herein, the first network device 302a and/or a datacenter 304 can set up and establish a conference call between the first network device 302a and other network devices 302 such as the second network device 302b and the third network device 302c over a network-based communication system.

Step 906 can include combining data streams received from multiple network devices 302 with an outgoing data stream. In particular, step 906 can include combining, at the first network device, data streams received from the plurality of network devices with an outgoing data stream. For example, a mixer 316 on the first network device 302a can combine the received data streams with the outgoing data stream, in any suitable manner as described herein.

Step 908 can include providing the combined data stream to a user. In particular, step 908 can include providing the combined data stream to a user associated with the first network device 302a. For example, the first network device 302a can provide the conference call to a user that is using the first network device 302a to talk to other users in conference call.

Step 910 can include detecting a disconnection of a second network device 302b from the conference call. In particular, step 910 can include detecting a disconnection of a second network device 302b of the plurality of network devices 302 from the conference call. For example, the second network device 302b may experience a fault and disconnect from the conference call. When the second network device 302b disconnects from the conference call, the first network device 302a can detect the disconnection, as described herein. Alternatively, a datacenter 304 can inform the first network device 302a of the second network device's 302b disconnection from the conference call.

Step 912 can include receiving a request from the second network device 302b to rejoin the conference call. In particular, step 912 can include receiving a request from the second network device 302b to rejoin the communication session where the request includes the shared security element. For example, upon reconnecting the network-based communication system, the second network device 302b can request to resume the conference call with the first network device 302a and other network devices 302. For example, the second network device 302b can send, as part of the request, the shared security element agreed upon by the first network device 302a, the second network device 302b, and other network devices 302 for the conference call to the first network device 302a.

Step 914 can include authorizing the request from the second network device 302b. In particular, step 914 can include authorizing the request from the second network device 302b based on the shared security element. For example, the first network device 302a can verify the shared security element found in the request from the second network device 302b to rejoin the conference call, in any suitable manner as described herein. For instance, the first network device 302a can verify that the shared security element is valid.

Step 916 can include rejoining the second network device 302b to the conference call. In particular, step 916 can include rejoining the second network device 302b to the conference call. For example, upon authorizing the request from the second network device 302b, the first network device 302a can allow the second network device 302b to rejoin the conference call, as described herein. In some embodiments, the first network device 302a can facilitate the second network device 302b rejoining the conference call without any support from a datacenter 304.

Figure 10:
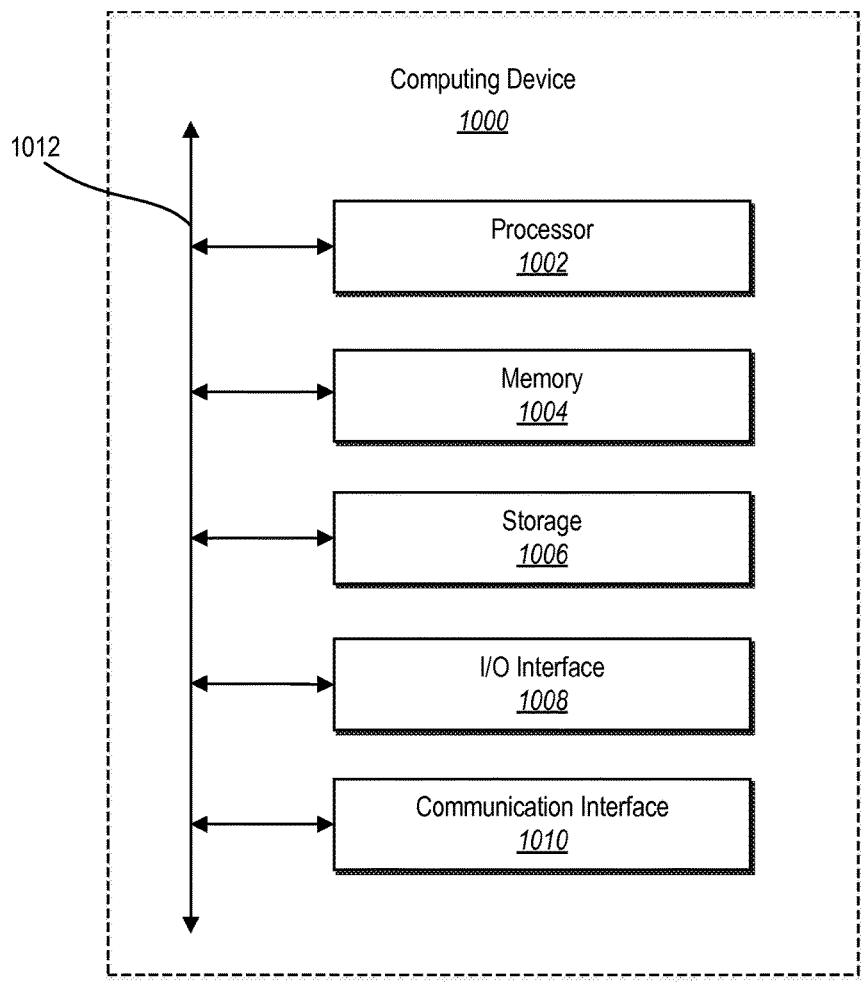
FIG. 10 illustrates a block diagram of an example computing device according to the principles described herein.

FIG. 10 illustrates, in block diagram form, an exemplary computing device 1000 that may be configured to perform one or more of the processes described above. One will appreciate that system 100, and/or VoIP system 200 each comprises one or more computing devices in accordance with implementations of computing device 1000. As shown by FIG. 10, the computing device can comprise a processor 1002, a memory 1004, a storage device 1006, an I/O interface 1008, and a communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers ("TLBs"). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as random access memory ("RAM"), read only memory ("ROM"), a solid-state disk ("SSD"), flash, phase change memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive ("HDD"), a floppy disk drive, flash memory, an optical disc, a magneto-optical disc, magnetic tape, or a universal serial bus ("USB") drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In other embodiments, Storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 1010 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communications signals between a network device 102 and one or more datacenters 104.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communications devices, transmission control protocol ("TCP"), internet protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MMS"), radio frequency ("RF") signaling technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, an InfiniBand bus, or another suitable bus or a combination thereof.

Figure 11:
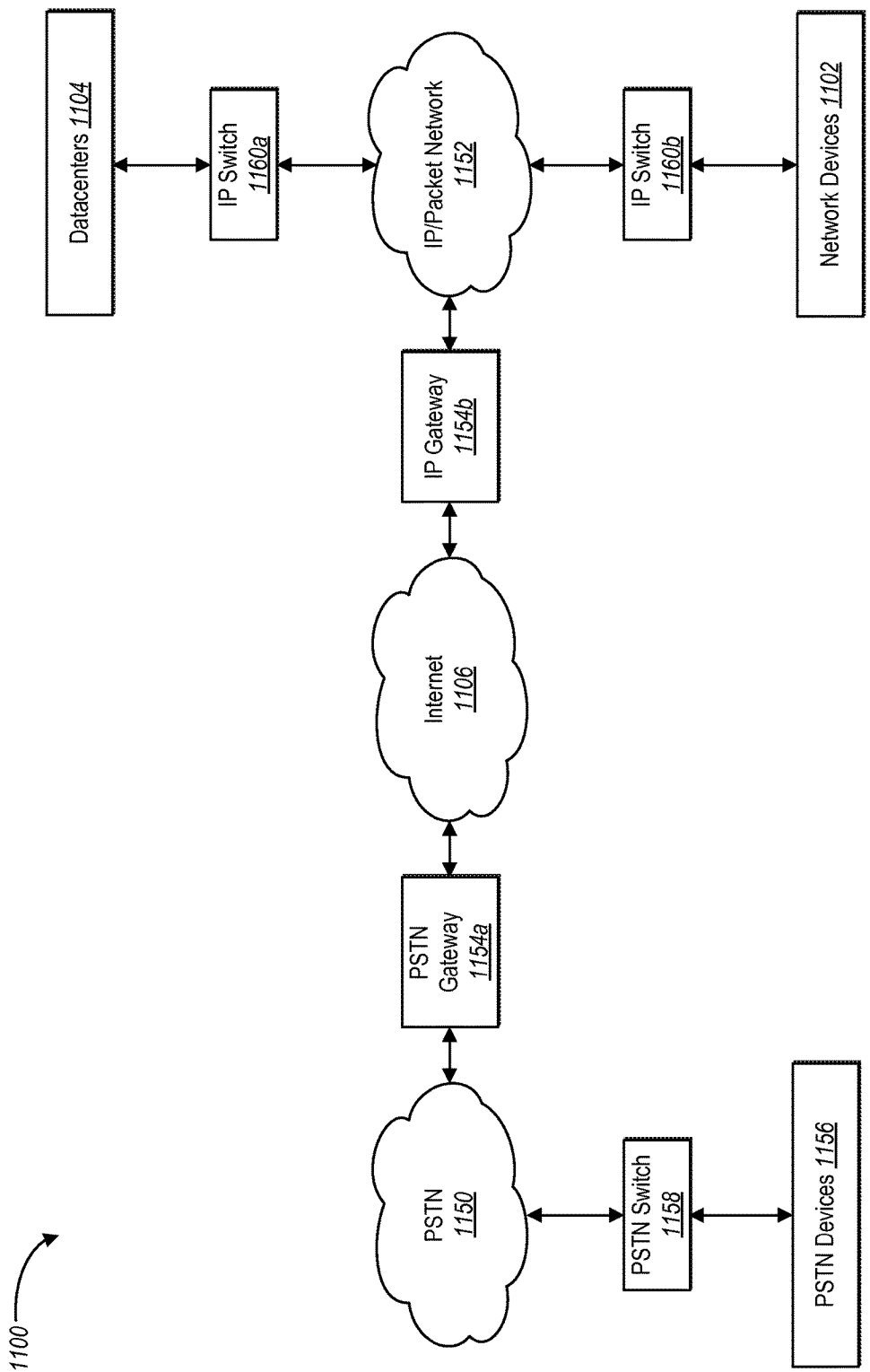
FIG. 11 illustrates an example network environment of a VoIP communication system according to the principles described herein.

FIG. 11 illustrates an example network environment of a telecommunications system 1100 according to the principles described herein. In particular, the telecommunications system 1100 may facilitate both network-based communication systems as well as circuited-switched traditional communication systems. For example, the telecommunications system 1100 may allow a user calling from a traditional landline to converse with a user using a VoIP device. In addition, while FIG. 11 illustrates exemplary components and devices according to one embodiment, other embodiments may omit, add to, reorder, and/or modify any of the components and devices shown in FIG. 11.

The telecommunication system 1100 may include a PSTN 1150 and an IP/packet network 1150. The PSTN 1150 and the IP/packet network 1152 may be connected via a network, such as the Internet 1106, intranet, or over a private network. In some configurations, the PSTN 1150 and/or the IP/packet network 1152 may be connected to the Internet 1106 via a PSTN gateways 1154*a* or an IP gateway 1154*b*. For example, gateway 1154*b* may be a signaling gateway and/or a media gateway. For instance, the signaling gateway processes and translates bidirectional SIP signals, and the media gateway handles real-time transport protocol communications. In addition, network trunks may interconnect the PSTN 1150, the Internet 1106, and the IP/packet network 1150.

The PSTN 1150 may connect to one or more PSTN devices 1156. For example, a PSTN switch 1158 may connect the one or more PSTN devices 1156 to the PSTN 1150. PSTN devices 1156 may include a variety of devices ranging from traditional landline devices to mobile/cellular devices. In some embodiments, the PSTN can connect to a network-based communication system via a datacenter.

The PSTN 1150 may include, but is not limited to, telephone lines, fiber optic cables, microwave transmission links, cellular networks, communications satellites, and undersea telephone cables. Switching centers may interconnect each of this components and networks. Further, the PSTN 1150 may be analog or digital. In addition, the PSTN 1150 may use protocols such as common channel signaling system 7 ("CCS7"). CCS7 is a set of protocols used in the PSTN 1150 to setup and tear down communications between subscribers (i.e., users).

As illustrated in FIG. 11, the telecommunications system 1100 may include an IP/packet network 1152. The IP/packet network 1152 may be part of a network-based system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 1152 provides communications services between users over the Internet 1106 rather than using a traditional PSTN 1150. However, VoIP systems also allow users to communicate with users using PSTN 1150. Thus, a subscriber using a network device 1102 may communicate with a subscriber using a PSTN device 1156. Furthermore, VoIP systems allow users to communicate with each other without accessing the PSTN 1150.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 11, the IP/packet network 1152 may also include network devices 1102 devices and datacenters 1104. The network devices 1102 devices and datacenters 1104 illustrated in FIG. 11 may be exemplary configurations of the network device 302 and datacenters 204 described above. For example, example of network devices 1102 include a variety of devices, such as personal computers, a tablet computer, handheld devices, mobile phones, smartphones, a personal digital assistants ("PDA"), in- or out-of-car navigation systems, and other electronic access devices. In addition, the network device 1102 may be part of an enterprise environment, such as a professional business exchange ("PBX"), a small office/home office environment, or a home/personal environment.

As briefly described above, network devices 1102 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Datacenter 1104 may facilitate communications between network devices 1102. For example, datacenter 1104 registers devices, stores device identification and address information, tracks current communications, and logs past communications, etc., as described above. In addition, datacenters 1104 also assists network devices in provisioning, signaling, and establishing user communications via a media bridge.

In the case of multiple datacenters 1104, one datacenter 1104 may communicate with another datacenter 1104. For example, one datacenter 1104 may send gathered network device 1102 information to the other datacenter 1104. In particular, when a datacenter 1104 registers a network device 1102, that datacenter 1104 may send the address information to the other datacenters 1104 located on the IP/packet network 1152. Accordingly, each datacenter 1104 may communicate with others datacenters 1104 and assist the IP/packet network 1152 in balancing network and processing loads. Further, the datacenters 1104 may assist the IP/packet network 1152 to ensure that communication sessions between network devices 1102 do not fail by communicating with each other.

As illustrated, the network devices 1102 and the datacenters 1104 may be connected to the IP/packet network 1152 via IP switches 1160a-b. IP switches 1160a-b manage the flow of data across the IP/packet network 1152 by transmitting a received message to the device for which the message was intended. In some configurations, the IP switches 1160a-b may also perform router functions. Further, while not illustrated, one or more modems may be in electronic communication with the IP switches 1160a-b.

In addition, the IP/packet network 1152 may facilitate session control and signaling protocols to control the signaling, set-up, and teardown of communication sessions. In particular, the IP/packet network 1152 may employ SIP signaling. For example, the IP/packet network 1152 may include a SIP server that processes and directs signaling between the network devices 1102 and the IP/packet network 1152. Other protocols may also be employed. For example, the IP/packet network 1152 may adhere to protocols found in the H.225, H.323, and/or H.245 standards, as published by the International Telecommunications Union, available at the following URL—http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 1102, the BYE method terminates the communication session.

Once signaling is established, the IP/packet network 1152 may establish a media bridge. The media bridge caries the payload data for a communication session. The media bridge is separate for the device signaling. For example, in a videoconference, the media bride includes audio and video data for a communication session.

As described above a datacenter 1104 may facilitate a media bridge path for a network device 1102. For example, when one network device 1102 attempts the contact a second network device 1102, the datacenter 1104 may execute the signaling and also determine a media bridge between the two network devices 1102. Further, the datacenter 1104 may provide alternative media bridge paths to the network devices 1102 in the event that the primary media bridge weakens, for example, below a threshold level, or even fails.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments disclosed herein.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
establishing, using a multiple-phase commit process, a communication session between a first network device and a plurality of network devices;
sending, from the first network device, an outgoing data stream to each of the plurality of network devices participating in the communication session;
receiving, at the first network device, a data stream from each network device of the plurality of network devices participating in the communication session;
combining, at the first network device, the data streams received from each network device of the plurality of network devices participating in the communication session with the outgoing data stream into a combined single data stream; and
providing the combined single data stream to a user associated with the first network device.

2. The method of claim 1, wherein the communication session is established via support by a datacenter, and wherein the datacenter withdraws the support to the first network device and the plurality of network devices upon establishing the communication session.

3. The method of claim 1, further comprising:
receiving, at the first network device, a request from the user associated with the first network device to participate in the communication session with a plurality of users associated with the plurality of network devices; and
identifying addresses associated with the plurality of network devices in response to the user request.

4. The method of claim 3, wherein identifying addresses associated with the plurality of network devices further comprises receiving the addresses associated with the plurality of network devices from a datacenter.

5. The method of claim 1, wherein sending the outgoing data stream further comprises sending the outgoing data stream to a duplicator that sends a copy of the outgoing data stream to each of the plurality of network devices.

6. The method of claim 1, wherein the multiple-phase commit process comprises a prepare phase and a commit phase.

7. The method of claim 1, further comprising:
sharing a security element corresponding to the communication session between the first network device and the plurality of network devices; and
storing the shared security element at the first network device.

8. The method of claim 7, further comprising detecting that a second network device of the plurality of network devices is no longer participating in the communication session.

9. The method of claim 8, further comprising receiving a request from the second network device to rejoin the communication session.

10. The method of claim 9, further comprising authorizing the second network device to rejoin the communication session based on the second network device providing the shared security element.

11. The method of claim 10, wherein authorizing the second network device to rejoin the communication session further comprises determining that the request to rejoin the communication session is received before a dismissal timer expires, the dismissal timer starting upon detecting that the second network device is no longer participating in the communication session.

12. The method of claim 8, further comprising sharing a new security element corresponding to the communication session between the first network device and a third network device of the plurality of network devices.

13. The method of claim 7, further comprising:
receiving an indication to add a fourth network device to the communication session;
sharing a new security element corresponding to the communication session between the first network device, the fourth network device, and the plurality of network devices; and
adding, upon sharing the new security element, the fourth network device to the communication session.

14. The method of claim 1, wherein establishing a communication session further comprises employing a two-phase commit process between the first network device and the plurality of network devices.

15. The method of claim 1, further comprising storing state information associated with the plurality of network devices in the communication session at the first network device.

16. The method of claim 15, further comprising:
detecting a fault at the first network device that causes the first network device to disconnect from the communication session; and
rejoining the communication session using the stored state information associated with the plurality of network devices in the communication session.

17. A method comprising:
negotiating a shared security element between a first network device and a plurality of network devices;
establishing a conference call in a network environment between the first network device and the plurality of network devices;
combining, at the first network device, data streams received from the plurality of network devices with an outgoing data stream into a combined single data stream;
providing the combined single data stream to a user associated with the first network device;
detecting a disconnection of a second network device of the plurality of network devices from the conference call;
receiving a request from the second network device to rejoin the conference call, the request including the shared security element;
authorizing the request from the second network device based on the shared security element; and
rejoining the second network device to the conference call.

18. The method of claim 17, wherein authorizing the request from the second network device further comprises verifying that the shared security element has not expired.

19. The method of claim 17, further comprising:
starting a timer upon detecting the disconnection of the second network device from the conference call; and
verifying that the timer has not expired before authorizing the second network device to rejoin the conference call.

20. A network device comprising:
at least one processor; and at least one non-transitory computer readable storage medium storing instructions thereon that, when executed by the at least one processor, cause the network device to:
- establish, using a multiple-phase commit process, a communication session between a first network device and a plurality of network devices;
- send an outgoing data stream to each of the plurality of network devices participating in the communication session;
- receive a data stream from each network device of the plurality of network devices participating in the communication session;
- combine the data streams received from each network device of the plurality of network devices participating in the communication session with the outgoing data stream into a combined single data stream; and
- provide the combined single data stream to a user associated with the first network device.

* * * * *